United States Patent
Kobayashi

(10) Patent No.: US 7,206,752 B2
(45) Date of Patent: Apr. 17, 2007

(54) METHOD AND APPARATUS FOR AIDING PRODUCT LIFE CYCLE PLANNING AND COMPUTER PROGRAM PRODUCT THEREFOR

(75) Inventor: Hideki Kobayashi, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 976 days.

(21) Appl. No.: 09/818,612

(22) Filed: Mar. 28, 2001

(65) Prior Publication Data

US 2001/0029461 A1    Oct. 11, 2001

(30) Foreign Application Priority Data

Mar. 31, 2000   (JP)   ............................. 2000-099876
Feb. 28, 2001   (JP)   ............................. 2001-055525

(51) Int. Cl.
*G05B 19/418* (2006.01)
(52) U.S. Cl. .................... 705/8; 705/7; 700/95; 700/97
(58) Field of Classification Search ................. 705/7, 705/8; 700/95, 97
See application file for complete search history.

(56) References Cited

U.S. PATENT DOCUMENTS

| | | | |
|---|---|---|---|
| 5,436,843 A * | 7/1995 | Kamejima et al. | ............. 700/95 |
| 5,652,708 A * | 7/1997 | Miyamoto et al. | .......... 700/106 |
| 5,768,129 A | 6/1998 | Miyamoto | |
| 5,852,560 A * | 12/1998 | Takeyama et al. | ............. 700/97 |
| 5,878,433 A | 3/1999 | Miyamoto | |
| 6,434,438 B1 * | 8/2002 | Jin et al. | ....................... 700/95 |
| 6,529,788 B1 * | 3/2003 | Tani et al. | ..................... 700/97 |
| 6,811,344 B1 * | 11/2004 | Kobayashi et al. | ............ 403/2 |

FOREIGN PATENT DOCUMENTS

| | | |
|---|---|---|
| EP | 948218 A2 * | 10/1999 |
| EP | 0 977 137 | 2/2000 |
| JP | 10-216689 | 8/1998 |
| JP | 11-288427 | 10/1999 |

OTHER PUBLICATIONS

Jeroen P. Rombouts, "LEADS-II A Knowledge-based system for ranking DfE-Options", Process of the 1998 IEEE International Symposium on Electronics and the Environment, May 4, 1998, pp. 287-291.
U.S. Appl. No. 09/818,612, filed Mar. 28, 2001, Kobayashi.
U.S. Appl. No. 10/392,865, filed Mar. 21, 2003, Kobayashi.

\* cited by examiner

*Primary Examiner*—Catherine M. Tarae
(74) *Attorney, Agent, or Firm*—Oblon, Spivak, McClelland, Maier & Neustadt, P.C.

(57) ABSTRACT

A method for aiding product life cycle planning, including setting a threshold value concerning reuse of parts with respect to cost and environment; reading cost of parts and environment load information from a database; displaying parts on a map displayed on a display device and divided into a plurality of domains based on the threshold; selecting reuse candidate parts from the displayed parts with reference to the displayed map; calculating a useful life based condition formula for determining that parts are possible to reuse only in the case where a remaining useful life of parts j to be included in a reuse source product i remains more than a use period of a reuse destination product i' even if the use period of the reuse source product i is elapsed; determining whether the useful-life based condition formula is satisfied; and determining possibility of reuse with respect to the reuse candidate parts when the useful life based condition formula is satisfied.

6 Claims, 26 Drawing Sheets

| SUBJECT CATEGORY | LIFE CYCLE STEPS | ENVIRONMENT DEMANDS | MUST/WANT | | | | ENVIRONMENTAL CHARACTERISTIC | TARGET VALUE | | | |
|---|---|---|---|---|---|---|---|---|---|---|---|
| | | | Ver 1 | Ver 2 | Ver 3 | Ver 4 | | Ver 1 | Ver 2 | Ver 3 | Ver 4 |
| SAVING RESOURCES | MATERIAL ACQUISITION | | | | | | | | | | |
| | PRODUCTION | | | | | | | | | | |
| | DISTRIBUTION | SIMPLIFICATION OF PACKING | | | | | | | | | |
| | USE | WATER USE REDUCTION | W | W | W | W | VOLUME OF WATER PER ONE TIME [L] | | | | 40 |
| | DISPOSAL | | | | | | | | | | |
| SAVING ENERGY | MATERIAL ACQUISITION | | | | | | | | | | |
| | PRODUCTION | | | | | | | | | | |
| | DISTRIBUTION | | | | | | | | | | |
| | USE | POWER CONSUMPTION REDUCTION | | | | | | | | | |
| | DISPOSAL | | | | | | | | | | |
| WASTE REDUCTION | MATERIAL ACQUISITION | | | | | | | | | | |
| | PRODUCTION | | | | | | | | | | |
| | DISTRIBUTION | | | | | | | | | | |
| | USE | | | | | | | | | | |
| | DISPOSAL | RECLAIMED DISPOSITION AMOUNT REDUCTION | | | | | | | | | |

F I G. 6A

| HARMFUL SUBSTANCES REDUCTION | MATERIAL ACQUISITION | ADOPTION OF LEAD-FREE SOLDER | W | | | | LEAD USE [g] | | | 0 | 0 |
|---|---|---|---|---|---|---|---|---|---|---|---|
| | PRODUCTION | | | | | | | | | | |
| | DISTRIBUTION | | | | | | | | | | |
| | USE | | | | | | | | | | |
| | DISPOSAL | | | | | | | | | | |
| EMISSION REDUCTION | MATERIAL ACQUISITION | | | | | | | | | | |
| | PRODUCTION | | | | | | | | | | |
| | DISTRIBUTION | | | | | | | | | | |
| | USE | WATER-POLLUTION REDUCTION | | | | | | | | | |
| | DISPOSAL | | | | | | | | | | |
| LIFE CYCLE OPTION | | UPGRADE | | W | W | W | | | | | |
| LIFE CYCLE OPTION | | MAINTENANCE | | W | W | M | MAINTENANCE POSSIBILITY RATE [%] | | 80 | 80 | 90 |
| LIFE CYCLE OPTION | | PARTS REUSE | | M | M | W | REUSE POSSIBILITY RATE [%] | | | 70 | 80 |
| LIFE CYCLE OPTION | | MATERIAL RECYCLE | M | M | M | M | RECYCLE POSSIBILITY RATE [%] | 70 | 70 | 70 | 70 |

FIG. 6B

- CONDITION FORMULA 1 : THE SIDE OF USEFUL LIFE $$\min\{la^{-i}, lr^{-i}\} \le la^{-i} - \min\{la^{-i}, lr^{-i}\}$$

WHERE $l^i$ IS LIFE TIME OF PRODUCT, $l^j$ IS LIFE TIME OF PARTS

• CONDITION FORMULA 2 : THE SIDE OF WORTH LIFE TIME $$tL^{i'} + tP^{i'} + \min\{la^{-i}, lr^{-i}\} \leq lr^{-i}$$

• CONDITION FORMULA 3 : THE SIDE OF RECOVERY QUANTITY $$\min\{la^{-i}, lr^{-i}\} < tL^{i'} + \alpha tP^{i'}$$

WHERE $0 \leq \alpha \leq 1$    $\alpha$ : PERIOD FACTOR

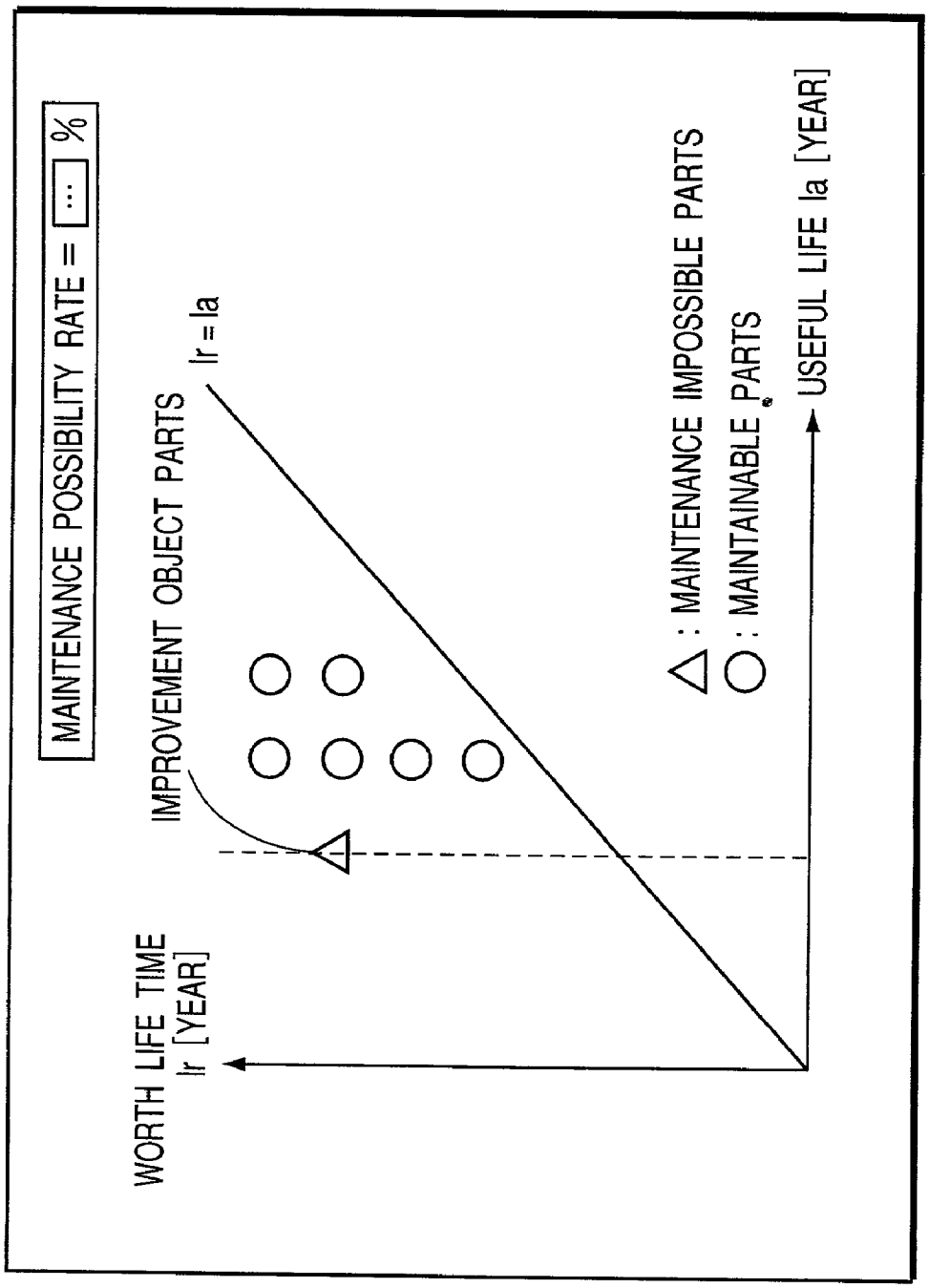
F I G. 26

METHOD AND APPARATUS FOR AIDING PRODUCT LIFE CYCLE PLANNING AND COMPUTER PROGRAM PRODUCT THEREFOR

CROSS-REFERENCE TO RELATED APPLICATIONS

This application is based upon and claims the benefit of priority from the prior Japanese Patent Applications No. 2000-099876, filed Mar. 31, 2000; and No. 2001-055525, filed Feb. 28, 2001, the entire contents of both of which are incorporated herein by reference.

BACKGROUND OF THE INVENTION

The present invention relates to method and apparatus for aiding plan and conceptual design of environmental harmonization product.

Product development such that one product model is grown by successively improving functions and components thereof for many generations is known as multi-generation product development. There is QFD (Quality Function Deployment) as a method for aiding product development planning for many generations, in particular, as a method for aiding plan of parts of product and the like. This QFD is used in aiding for performance aspect of product and product cost aspect.

This QFD does not consider environment aspect for the whole life cycle of product. In addition, a quantitative method for aiding concept generation of environmental harmonization product has never been existed.

Furthermore, severe environmental specification is the factor which decrease effect to environment, however, that is also the factor which increase product life cycle cost. Therefore, most effective concept should be led to realize the environmental specification after putting customer demands, corporation demands and environment demands together with respect to object product to set best environmental specification.

BRIEF SUMMARY OF THE INVENTION

It is an object of the present invention to provide method and apparatus for aiding product life cycle planning which establishes product concept reducing environment load at the step of product planning to determine environmental specification (such as recycle rate or level of energy conservation) and concept.

According to a first aspect of the present invention, there is provided an apparatus for aiding product life cycle planning comprising a setting section which sets product use period and longest part useful life of product, a determination section which determines product use period$\leq 0.5 \times$ longest part useful life, a proposal section which automatically proposes reuse of parts to new product when product use period$\leq 0.5 \times$longest part useful life is satisfied.

According to a second aspect of the present invention, there is provided a method for aiding product life cycle planning which comprises setting product use period and longest part useful life of product, determining product use period$\leq 0.5 \times$longest part useful life, and examining automatically reuse of parts to new product when product use period$\leq 0.5$ longest part useful life is satisfied.

According to a third aspect of the present invention, there is provided a computer program product for aiding product life cycle planning which comprises means for instructing a computer to prepare product use period and longest part useful life of product, means for instructing a computer to judge product use period$\leq 0.5 \times$longest part useful life and means for instructing the computer to examine parts reuse to new product when product use period$\leq 0.5 \times$longest part useful life is satisfied.

According to a fourth aspect of the present invention, there is provided an apparatus for aiding product life cycle planning which comprises a generator section which generates information concerning worth degradability wherein worth deterioration of parts relates to discard of product and cost ratio of parts to the whole product and an extracting section which extracts parts which is impossible to upgrade and whose worth degradability is highest as improvement object parts.

According to a fifth aspect of the present invention, there is provided a method for aiding product life cycle planning which comprises generating information concerning worth degradability wherein worth deterioration of parts relates to discard of product and cost ratio of parts to the whole product, and extracting parts which is impossible to upgrade and whose worth degradability is highest as improvement object parts.

According to a six aspect of the present invention, there is provided a computer program product for aiding product life cycle planning which comprises means for instructing a computer to prepare information concerning worth degradability wherein worth deterioration of parts relates to discard of product and cost ratio of parts to the whole product, and means for instructing the computer to extract parts which is impossible to upgrade and whose worth degradability is highest as improvement object parts.

According to an seventh aspect of the present invention, there is provided an apparatus for aiding product life cycle planning which comprises an environmental specification setting section which sets environmental characteristic of object product and target value thereof, a concept generator section which aids idea of various improvement concept of environment aspect, and a storage device which stores various database such as life cycle planning (LCP) database storing various information and LCP result which are generated in LCP.

BRIEF DESCRIPTION OF THE SEVERAL VIEWS OF THE DRAWING

FIGS. 6A and 6B show an example of setting of environmental specification;

FIG. 26 shows a display screen of improvement object parts for maintainability in accordance with another embodiment of the present invention;

DETAILED DESCRIPTION OF THE INVENTION

Figure 1:
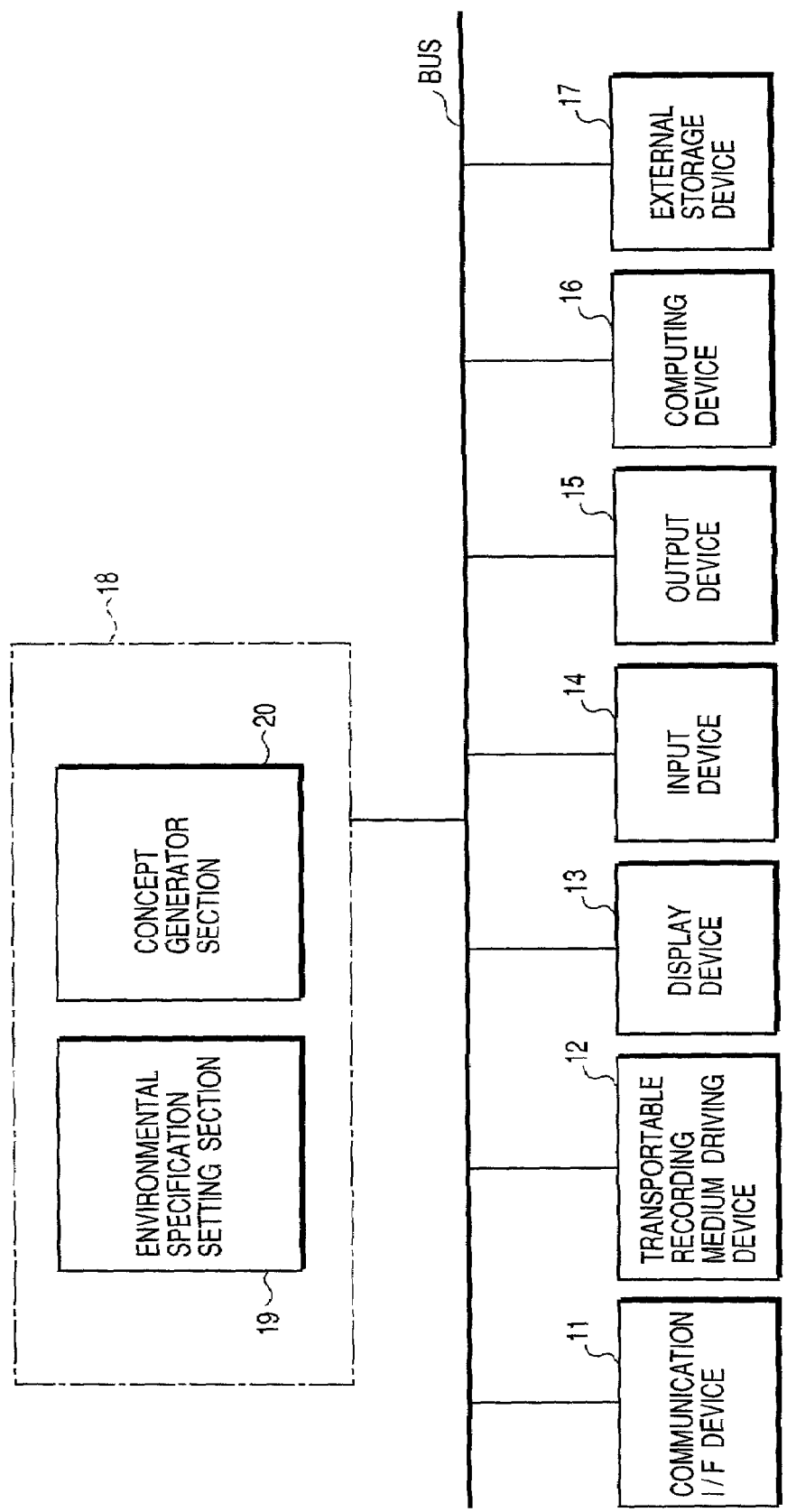
FIG. 1 shows a block diagram of apparatus for aiding product life cycle planning according to one embodiment of the present invention.

FIG. 1 shows constitution of apparatus for aiding product life cycle planning in accordance with one embodiment of the present invention. According to this, a communication I/F device 11, a transportable recording medium driving device 12, a display device 13, an input device 14, an output device 15, a computing device 16, an external storage device 17 and a memory are connected with a bus.

Program concerning various means in the present invention are stored in the external storage device 17, if necessary, for example, program concerning an environmental specification setting section 19 and a concept generator section 20 is read in the memory 18 to operate. Various database such as life cycle planning (LCP) database storing various information generated in LCP and LCP result are stored in the external storage device 17.

The computing device 16 makes input-output control, various operation process and the like by executing program in the memory 18. A mouse, a keyboard and the like are used as the input device 14, a printer and the like are used as the output device 15, and a display and the like are used as the display device 13. The transportable recording medium driving device 12 comprises a floppy disk drive, an optical disk drive and the like.

Figure 2:
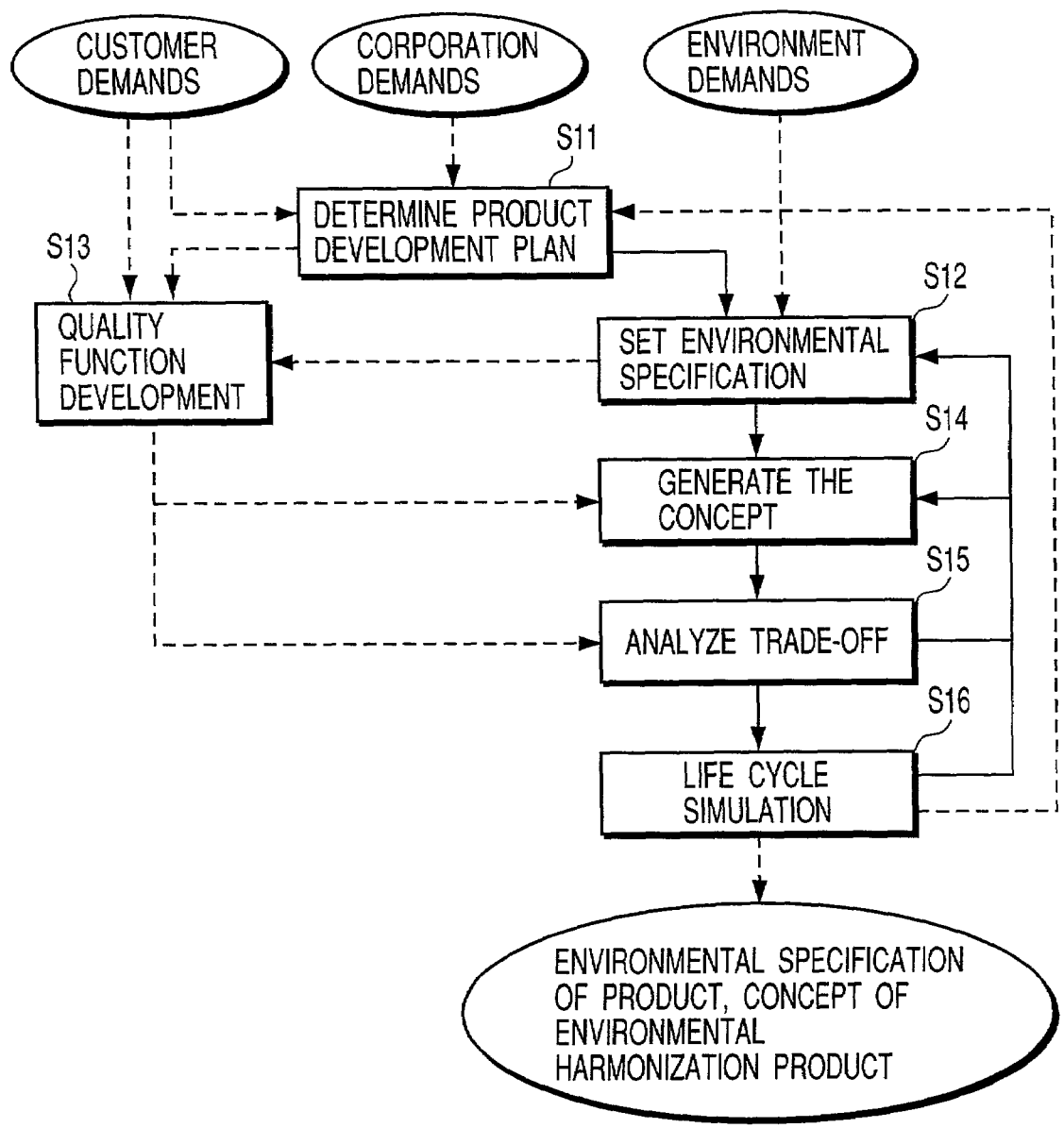
FIG. 2 shows schema of a process for aiding product life cycle planning according to one embodiment of the present invention.

Referring now to FIG. 2, operation of apparatus for aiding product life cycle planning of the embodiment will be described. This operation is carried out by a computer including the computing device according to program transferred from the external storage device 17 to the memory 17, and then the process result is displayed on the display device 13.

In the embodiment, setting of environmental specification and generation of the concept are based, and there are following five steps of:

1. Making product development plan.
2. Setting environmental specification.
3. Determining concept to realize the environmental specification.
4. Analyzing trade-off.
5. Realizing life cycle simulation and ascertaining achievement rate.

According to the steps described above, first, a product planner determines middle long-term product development plan based on customer demands and corporation demands (S11). Thus, the planner plans that what product is produced, how many products are produced and so forth. Next, environment demands to be aimed in object product are made clear by the environmental specification setting section 19. Then, the environmental characteristic corresponding to the environment demands is determined, and importance and target value of the environmental characteristic are set (S12). For example, use period of the object product, real use term, useful life and longest life in a part used in the product are set.

On the other hand, customer demands concerning the aspect of performance and cost of product, product characteristic (engineering metrics) and feature of part are made clear by QFD and the like (S13). At this time, the target value of each product and the presence or absence of new design for parts in each product development (that is, whether the same parts as old product may be used) are also defined.

Next, the concept is generated by the concept generator section 20 for aiding idea of the concept (realization scheme) to satisfy environmental specification (S14).

Then, trade-off is determined with respect to the aspect of performance, cost and environment, and a practicable concept is determined, and then possibility of frontloading of execution of the concept is examined (S15).

Lastly, environment effect and life cycle cost of each product or the whole development object product are calculated by a life cycle simulation section to ascertain reasonability of the concept (S16).

Accordingly, environment specification of each product which intends to be developed and the concept to realize that, that is, the concept of environmental harmonization product is decided.

Next, above-mentioned operation will be described in detail.

Figure 3:
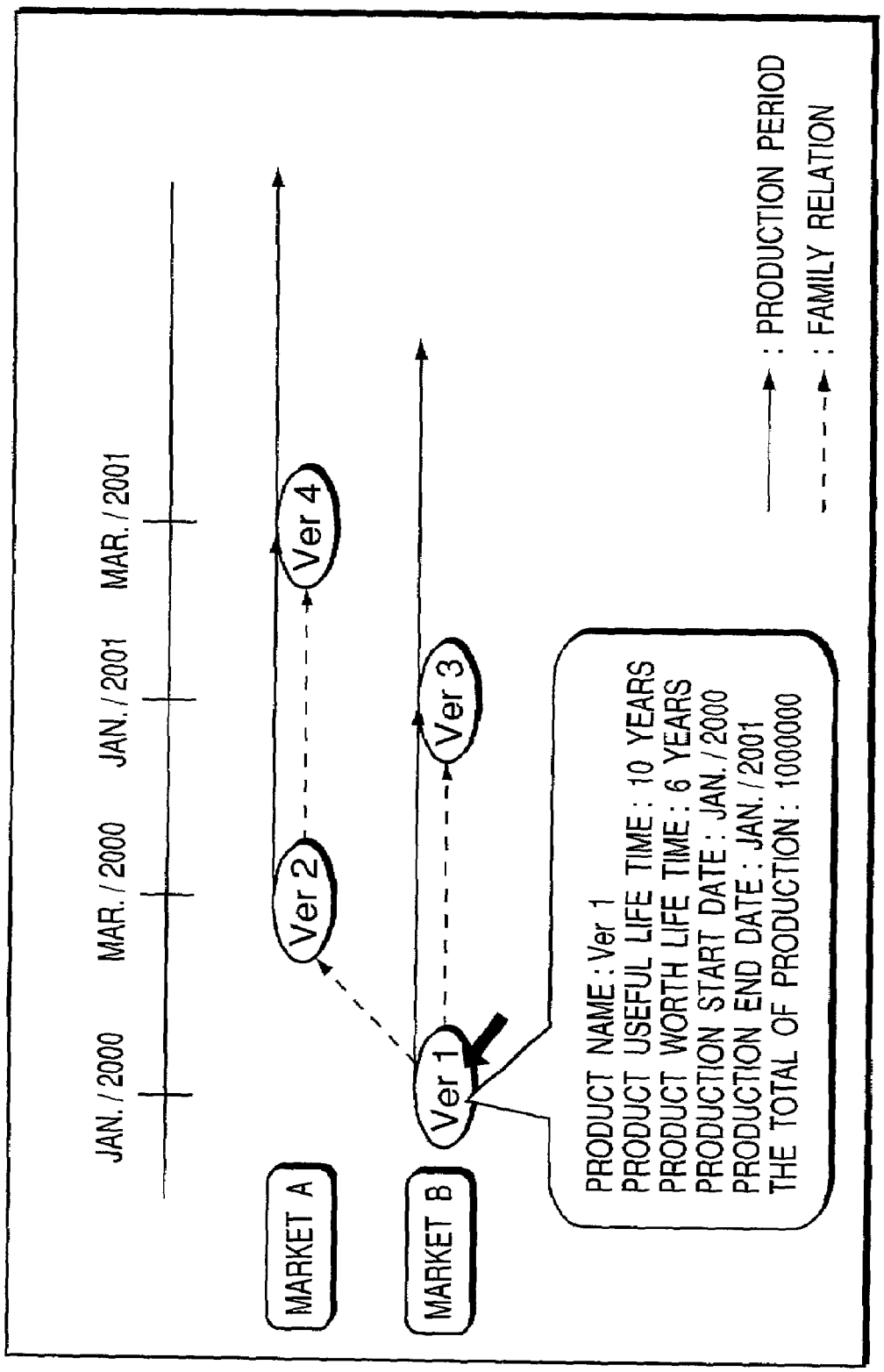
FIG. 3 shows one example of product development planning.

First, product development planning as shown in FIG. 3 is determined. Thus, developments of products Ver1 to Ver4 are planned about market A and market B. For example, product useful life time: 10 years, product use period: 6 years, production start date: January/2000, production end date: January/2001 and total of production are set at 1,000,000 with respect to product name Ver1.

Figure 4:
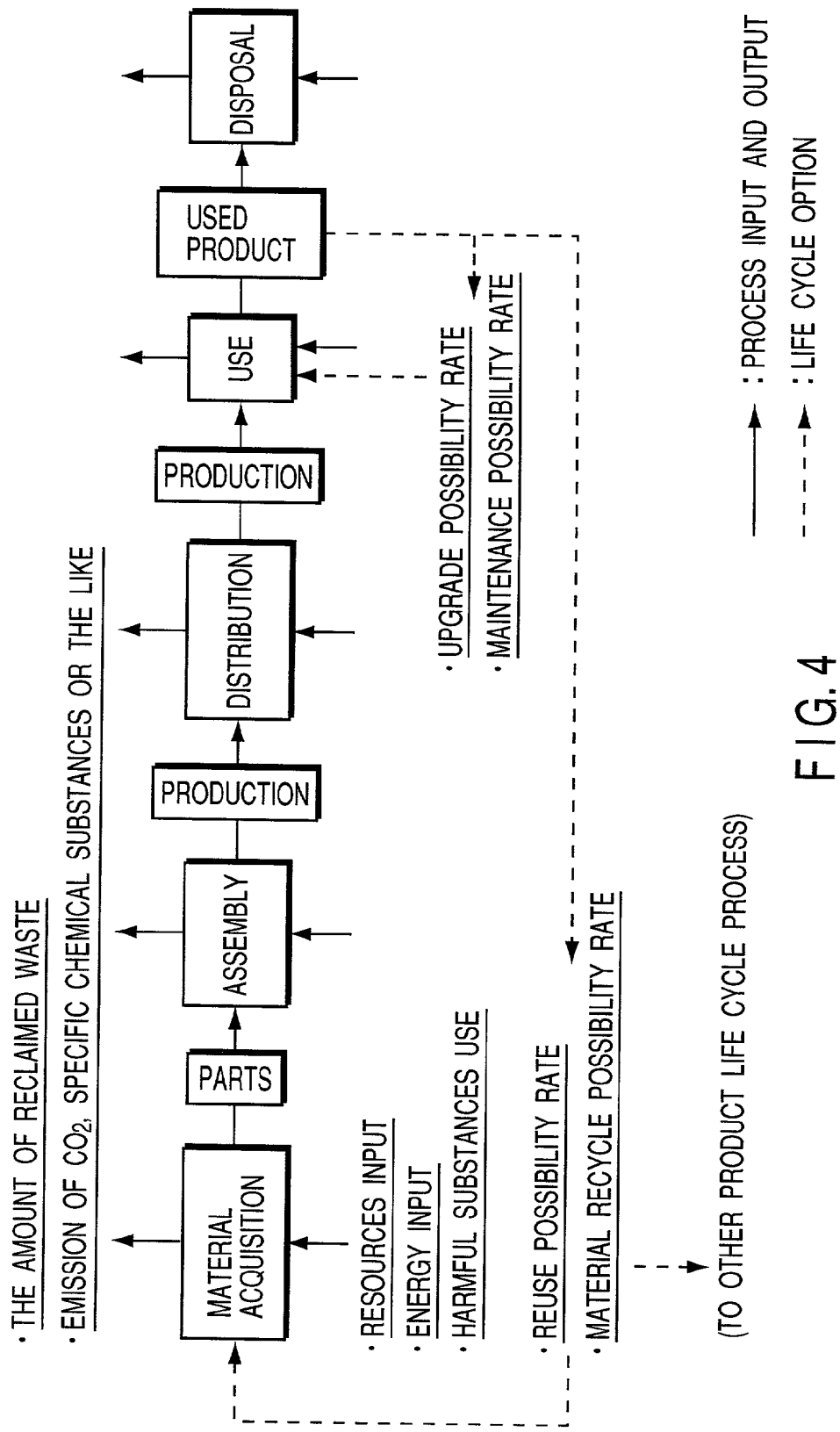
FIG. 4 shows one example of environment characteristic in product life Cycle.

The planner considers about effect to the aspect of environment for the whole product life cycle. An example of main environmental characteristic in this product life cycle is shown in FIG. 4. In product life cycle, an used product used through material acquisition, assembly, distribution and use stage is upgraded or maintained to return to the use stage, or to material acquisition stage to reuse or recycle.

Environment characteristic in this product life cycle can be classified roughly into index of the viewpoint of environment load (input and output of process of each stage in life cycle) and the viewpoint of resources circulation (life cycle option such as reuse or recycle). Environment characteristic of the aspect of environment load includes resources input, energy input, harmful substances use, the amount of reclaimed waste, the emission such as the amount of generation of $CO_2$.

Figure 5A:
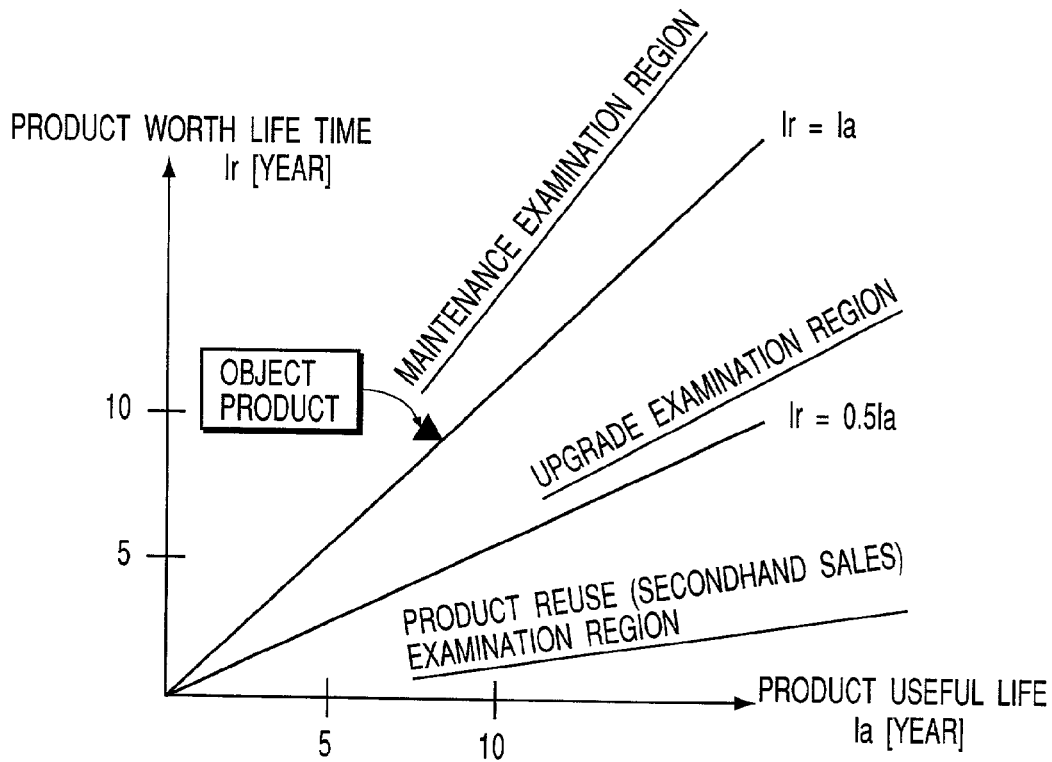
FIGS. 5A and 5B show examples of preliminary selection of life cycle option.

On the other hand, environment characteristic of the viewpoint of resources circulation includes upgrade possibility rate, maintenance possibility rate, reuse possibility rate, material recycle possibility rate and the like, for example, these rate are defined as described below:

upgrade possibility rate=the total cost of upgrade replaceable part/product cost maintenance possibility rate=the total cost of maintenance replaceable part/product cost reuse possibility rate=the total cost of reusable part/product cost recycle possibility rate=retrievable mass due to materials recycle/product mass Next, life cycle option which should be consideration object is preliminarily selected by showing information concerning useful life and use period of object product and useful life of each component by means of two dimensional graph wherein use period and useful life are indicated by ordinate and abscissa axes respectively, as shown in FIG. 5. Here, useful life is a period that product or parts maintains failure rate smaller than demanded failure rate, for example, product useful life is decided by product use period that a developer supposes as a guide. Product use period is a period that product maintains worth for product user, this is actualized as actual use period in market. In FIG. 5A, product use period and product useful life are plotted on the graph (Δ in FIG. 5A), and upgrade planning of product is examined at the user site if the plotted point is existed in the domain wherein 0.5×product useful life<product use period<product useful life is satisfied. If 0.5×product useful life≧product use period, reuse of product, that is, secondhand sales is examined. If the plotted point is existed in the domain wherein product use period>product useful life is satisfied, maintenance planning of product is examined at the user site.

On the other hand, useful life of component parts is generally longer than product useful life except consumable supplies, however, there is variation in its allowance. Therefore, in FIG. 5B, product use period and longest part useful life are plotted on the graph (in FIG. 5B), and planning of reuse of parts is examined if the plotted point is existed in the domain wherein product use period≦0.5×longest part useful life is satisfied. Thus, product use period and longest part useful life of product are set, and product use period≦0.5×longest part useful life is determined, then reuse of parts is automatically proposed when product use period≦0.5×longest part useful life is satisfied.

Value of 0.5 is decided because a part capable of using for more than 10 years is existed in the product when the product has been used for 5 years which is life time thereof and returned. Thus, if 5 years have passed and the product have returned, the part capable of using for more than 5 years yet is existed. There is possibility to take out this part to reuse. This is referred to as one more life. Therefore, life time of parts of object product is input.

Figure 5B:
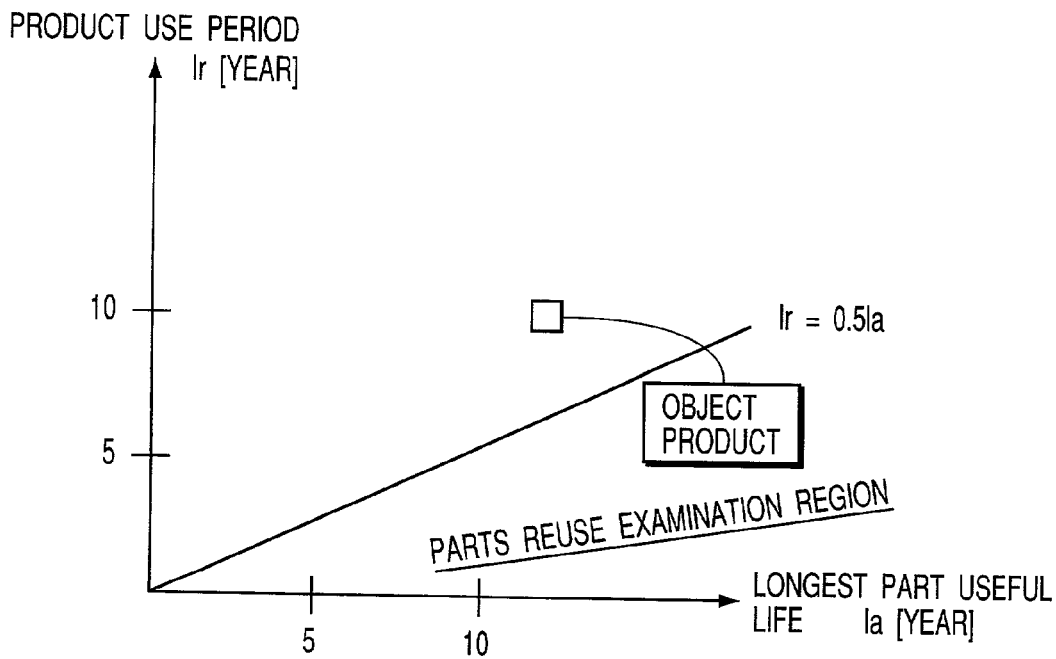

In the embodiment, maintenance, reuse of parts and materials recycle are preliminarily selected with information of FIGS. 5A and 5B. In whatever cases, recycle process is needed, and materials recycle is invariably selected. In addition, it is preferable that the planner inputs estimate value to determine when the information of part useful life is not existed.

Next, the planner sets environment characteristic items for environment demands classified into MUST demands which should be corresponded invariably and WANT demands which should be corresponded preferably, as shown in FIGS. 6A and 6B, and determines target value of each product. As shown in FIGS. 6A and 6B, target values of environmental characteristic (lead use, recycle rate) are set for each product. Lead use appears from Version 3. Blank space in Ver1 and Ver2 largest value means that it is preferable not to consider lead use.

Figure 7:
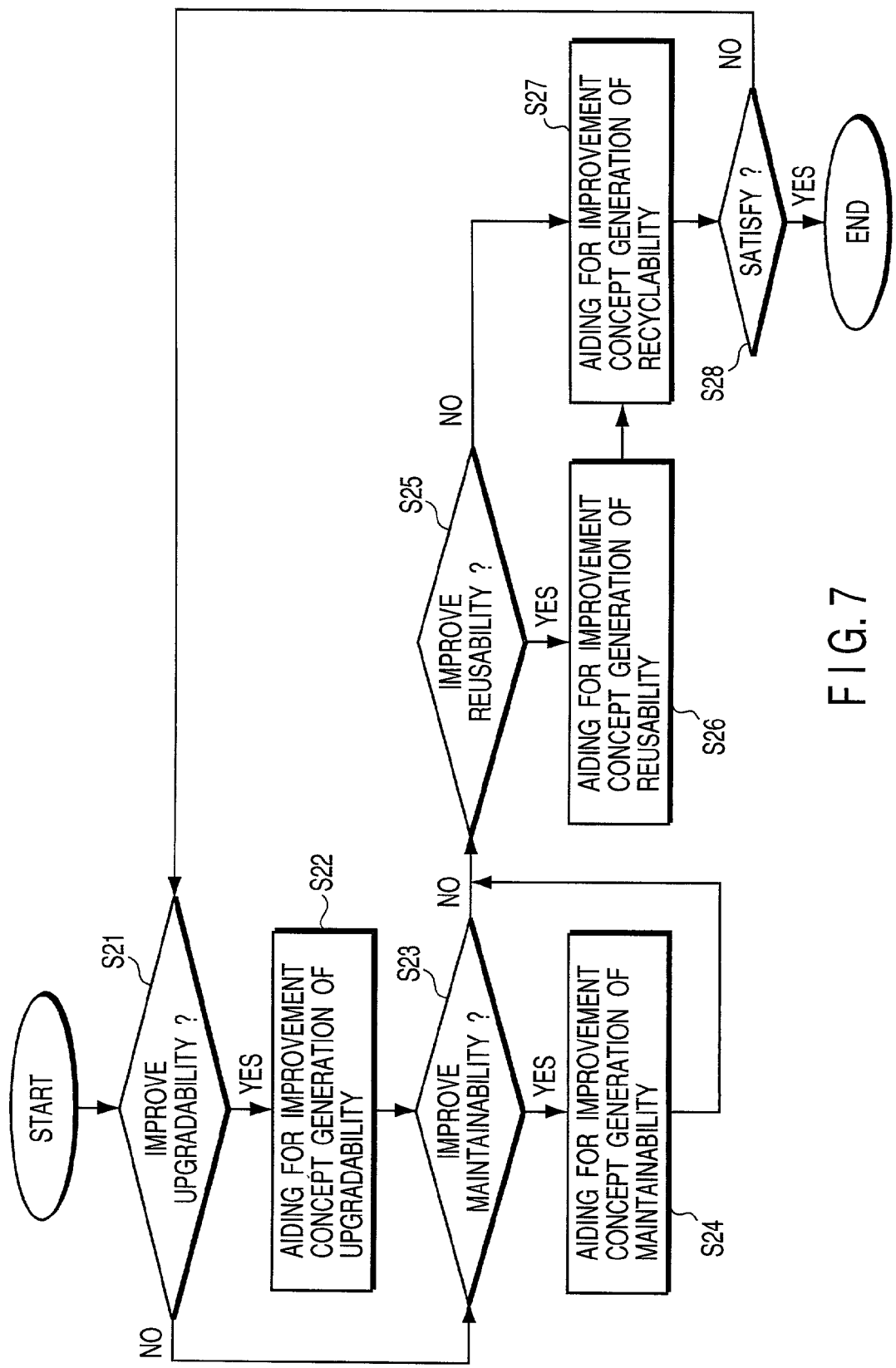
FIG. 7 shows a flow chart of aiding for concept generation.

Process for aiding concept generation to realize specification of the aspect of environment will be now described. Improvement concept generation about life cycle option of product which should be improved is aided in turn as shown in FIG. 7. Thus, the necessity of improvement of upgradability is determined (S21). If the determination is Yes, generation of improvement concept of upgradability is aided (S22). After this step S22, and if determination of step S21 is No, the necessity of improvement of maintenance is determined (S23). If the determination is Yes, generation of improvement concept of maintainability is aided (S24). After this step S24, and if determination of step S23 is No, the necessity of improvement of reusability is determination (S25). If determination is Yes, generation of improvement concept of reusability is aided (S26). After this step S26, and if determination of step S25 is No, generation of improvement concept of recycleability is aided (S27). After this, it is determined that whether improvement is satisfiable (S29). If this determination is Yes, process is over. If this determination is No, process is returned to the step S21.

Process described above is process which invariably pass through process of aiding for generation of improvement concept of recycleability.

Figure 9:
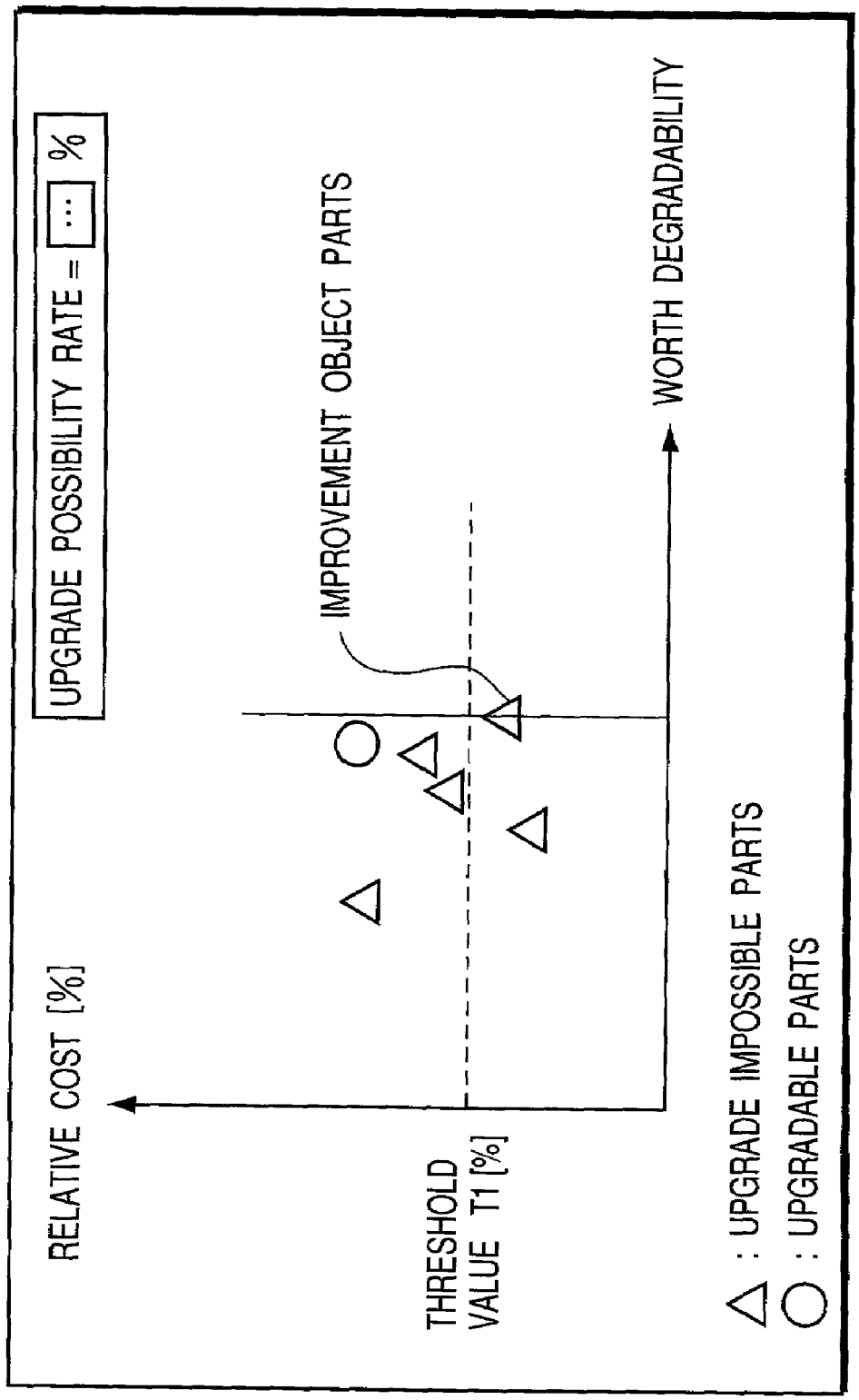
FIG. 9 shows a display screen of improvement object parts of upgradability.

FIG. 9 shows a process of aiding for generation of improvement concept of upgradability (S22 in FIG. 7). According to this, first, the planner sets a threshold value T1 which indicates relative cost (%) between upgrade replacement of parts by suitable cost and buying new product (S31). Relative cost is ratio of parts cost which holds in the whole cost of product. Next, propriety information of upgrade of parts, cost information and worth degradability information are read out from database LCC-DB, LCP-DB and displayed as shown in FIG. 9 (S32). It is preferable that the planner inputs data with estimation if information to be read is not existed in the database.

In FIG. 9, axis of ordinates shows relative cost (%), axis of abscissas shows worth degradability, Δ shows a part which is impossible to upgrade, and ○ shows a part which is possible to upgrade. Here, the system extracts a part whose worth degradability is highest from the whole parts except parts which is not more than threshold value and is capable of upgrade and presents it as improvement object parts (S33). Simultaneously, the foregoing upgrade possibility rate is calculated and displayed (S34). Worth degradability is defined as the value (no dimension) which shows relative degree for discard factor (function consumption, appearance, fashionability, capacity, size, new function, function improvement) caused by use period, which may be decided with the use of a method such as QFD.

Figure 10:
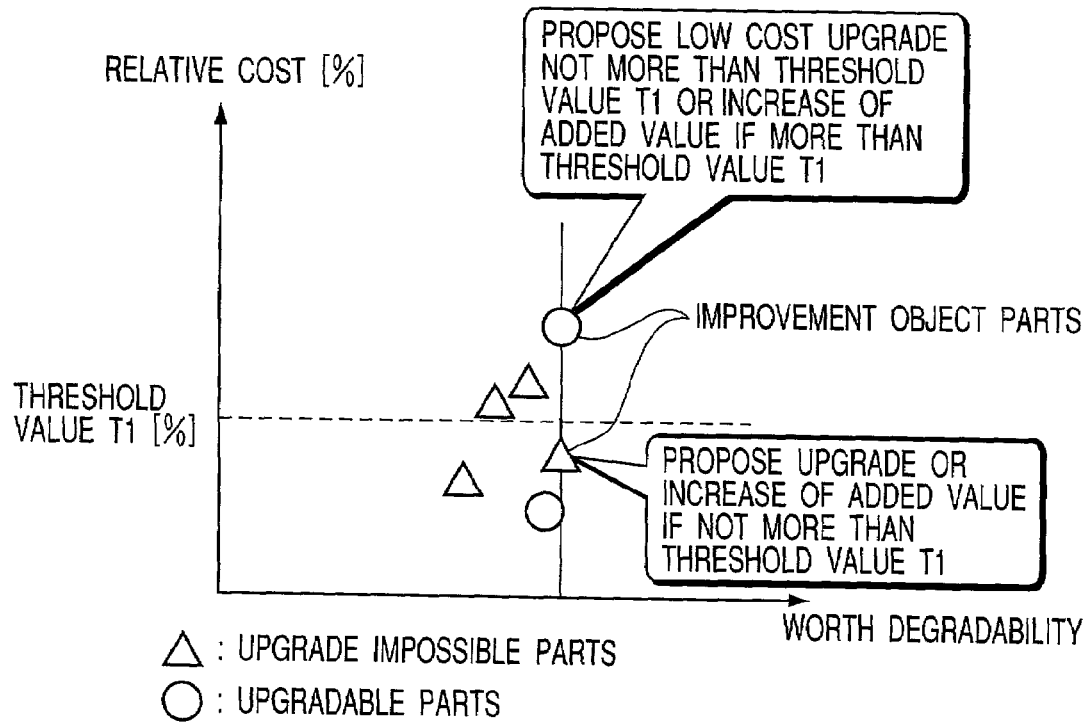
FIG. 10 shows one example of improvement concept of upgradability.

Next, the system determines whether the foregoing upgrade possibility rate is satisfied (S35). At this time, the system determines whether improvement object parts have relative cost more than threshold value T1. When improvement object parts have relative cost more than threshold value T1, low cost upgrade not more than threshold value T1 is proposed as shown in FIG. 10. On the other hand, when improvement object parts have relative cost not more than threshold value T1, the system proposes to change design so that parts is upgraded (S36). When the planner changes attribute of parts with reference to presented plan (S37), the system calculates the foregoing upgrade possibility rate and displays it again. Then if the planner is satisfied with this, the result is stored in database LCP-DB and process is ended (S38).

Figure 8:
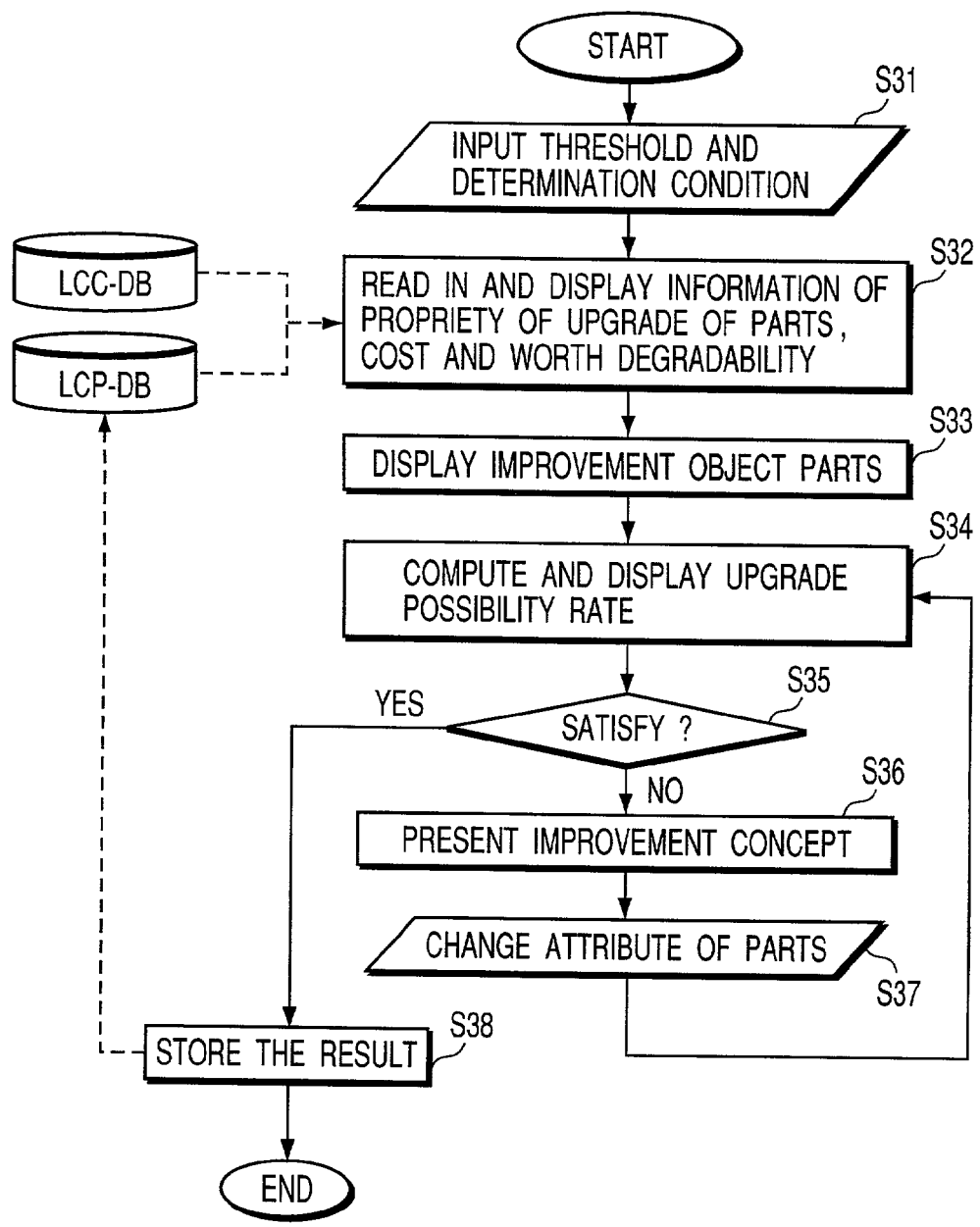
FIG. 8 shows a flow chart of aiding for improvement concept generation of upgradability.
Figure 11:
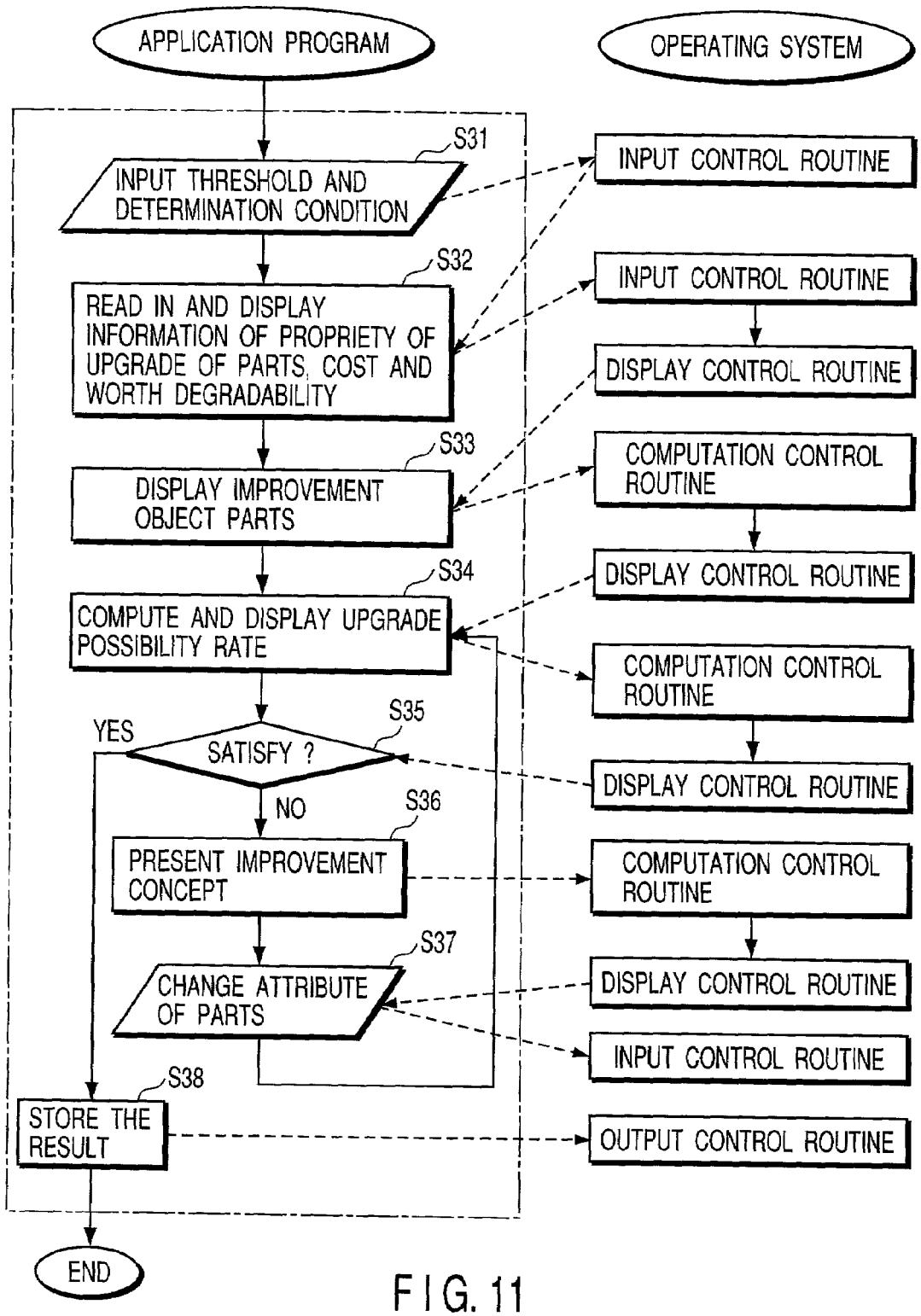
FIG. 11 shows cooperation between application program and operating system corresponding to the flow chart of aiding for improvement concept generation of upgradability of FIG. 8.

FIG. 11 shows operation cooperation relation between application program and operating system (OS) corresponding to process of aiding for generation of improvement concept of upgradability of FIG. 8. Thus, in process of aiding for generation of improvement concept of upgradability shown in FIG. 8, information concerning cost ratio of parts to the whole product and worth degradability indicating participation of worth deterioration of parts relates to discard of product is generated. Two-dimensional graph in which the worth degradability and the cost ratio are indicated by abscissa and ordinates axes respectively is displayed with parts constituting the product. A part which is impossible to upgrade and has the highest worth degradability is extracted as an improvement object part.

Figure 12:
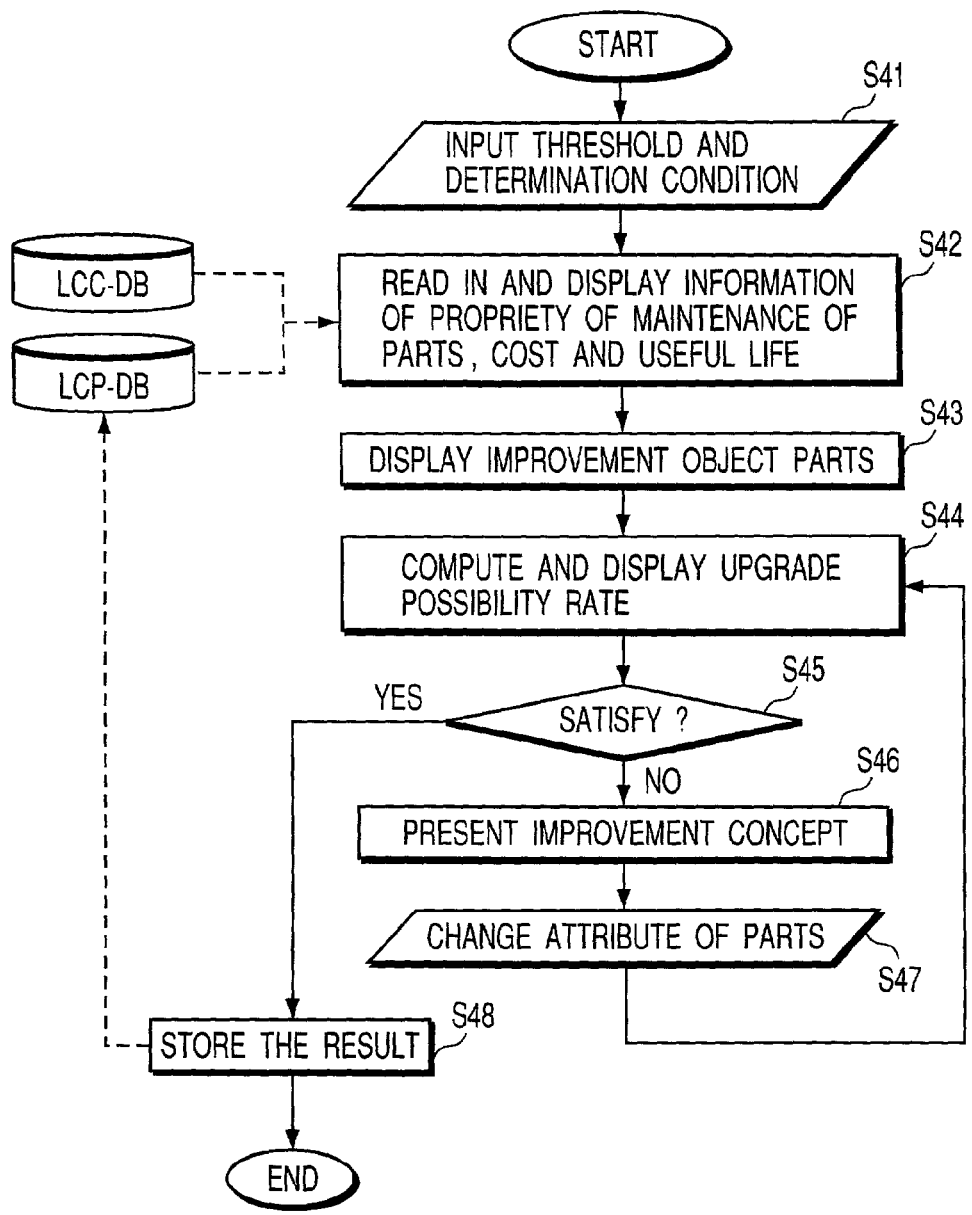
FIG. 12 shows a flow chart of aiding for improvement concept generation of maintainability.

Generation of improvement concept for maintainability of product is also aided by the same view as above-described aiding for generation of improvement concept of upgradability. FIG. 12 shows process of aiding for generation of improvement concept of maintainability. In this process, first, the planner sets threshold value T2 of relative cost (%) that allows selection between maintenance replacement of parts (low cost) and buying new product (high cost) (S41). The relative cost represents ratio of parts cost to the whole cost of product.

Next, propriety information of maintenance, cost information, useful life information are read in from database LCC-DB, LCP-DB to be displayed on relative cost-useful life map (S42). It is preferable that the planner inputs data with estimation if information to be read in is not existed.

Figure 13:
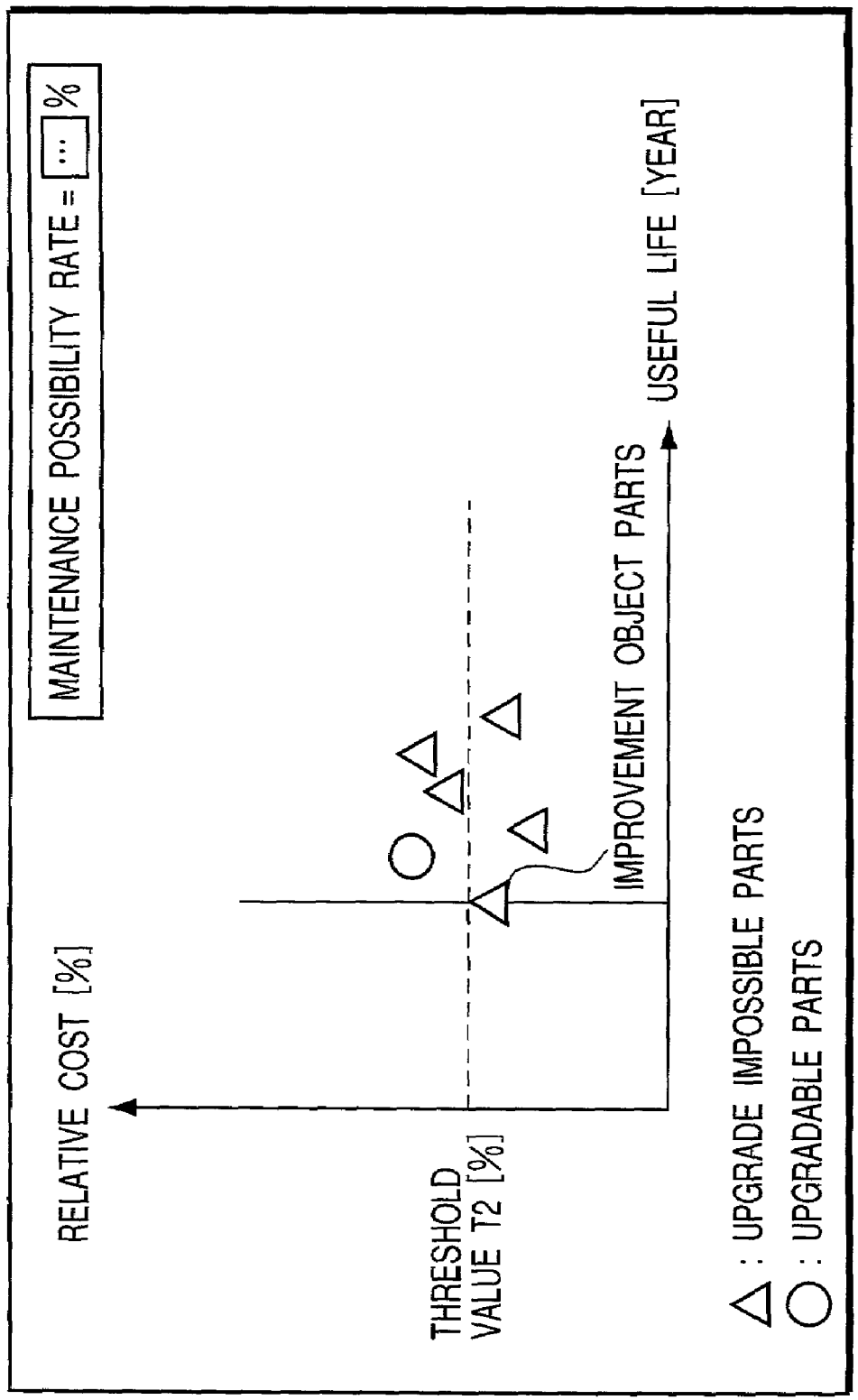
FIG. 13 shows an extraction screen of improvement object parts of maintainability.

Next, the system extracts a part of the smallest useful life from the whole parts except parts which is not more than threshold value and is capable of maintenance as improvement object parts and displays it (S43). Simultaneously, the foregoing maintenance possibility rate is calculated and displayed (S44). In FIG. 13, the ordinates axis shows relative cost (%), the abscissas axis shows useful life (years), Δ shows a part which is impossible to maintain, and ○ shows a part which is possible to maintain.

Figure 14:
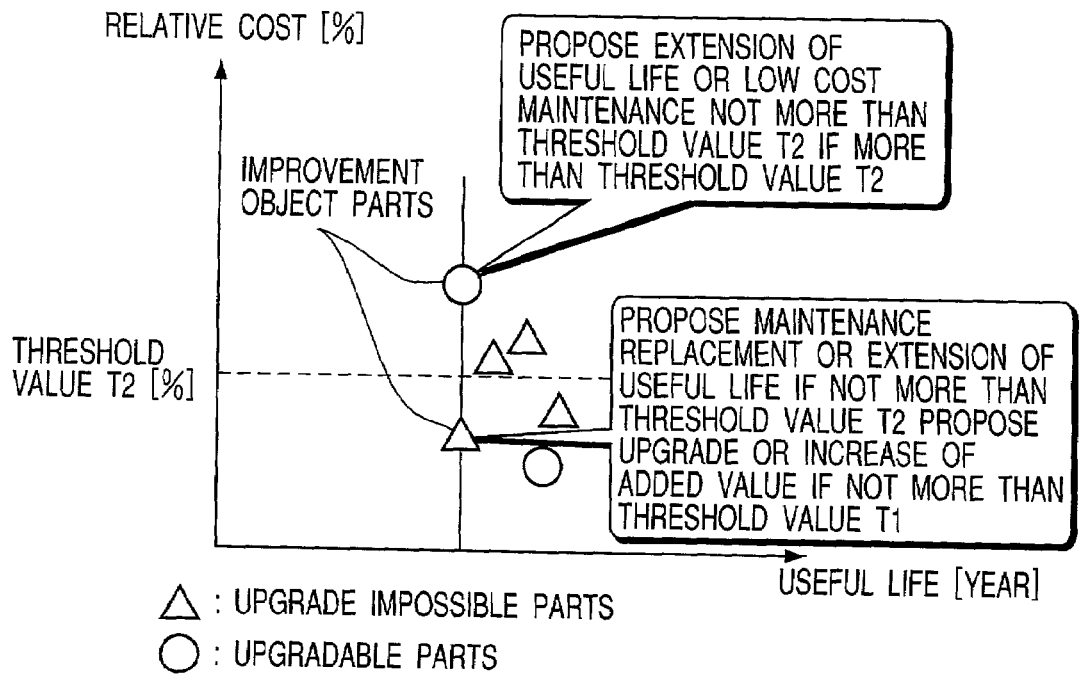
FIG. 14 shows a presentation example of improvement concept of maintainability.

Next, the system determines whether the calculated maintenance possibility rate is satisfied (S45). At this time, if improvement object parts have relative cost more than threshold value T2, low cost maintenance not more than threshold value T2 is proposed as shown in FIG. 14. On the other hand, when improvement object parts have relative cost not more than threshold value T2, the system proposes to change a design so that parts is capable of maintenance replacement (S46). When the planner changes attribute of parts with reference to presented plan (S47), the system returns to the step S44 again and calculate the maintenance possibility rate to display it. Then if the planner is satisfied with calculated maintenance possibility rate, the result is stored and process is ended (S48).

Figure 15:
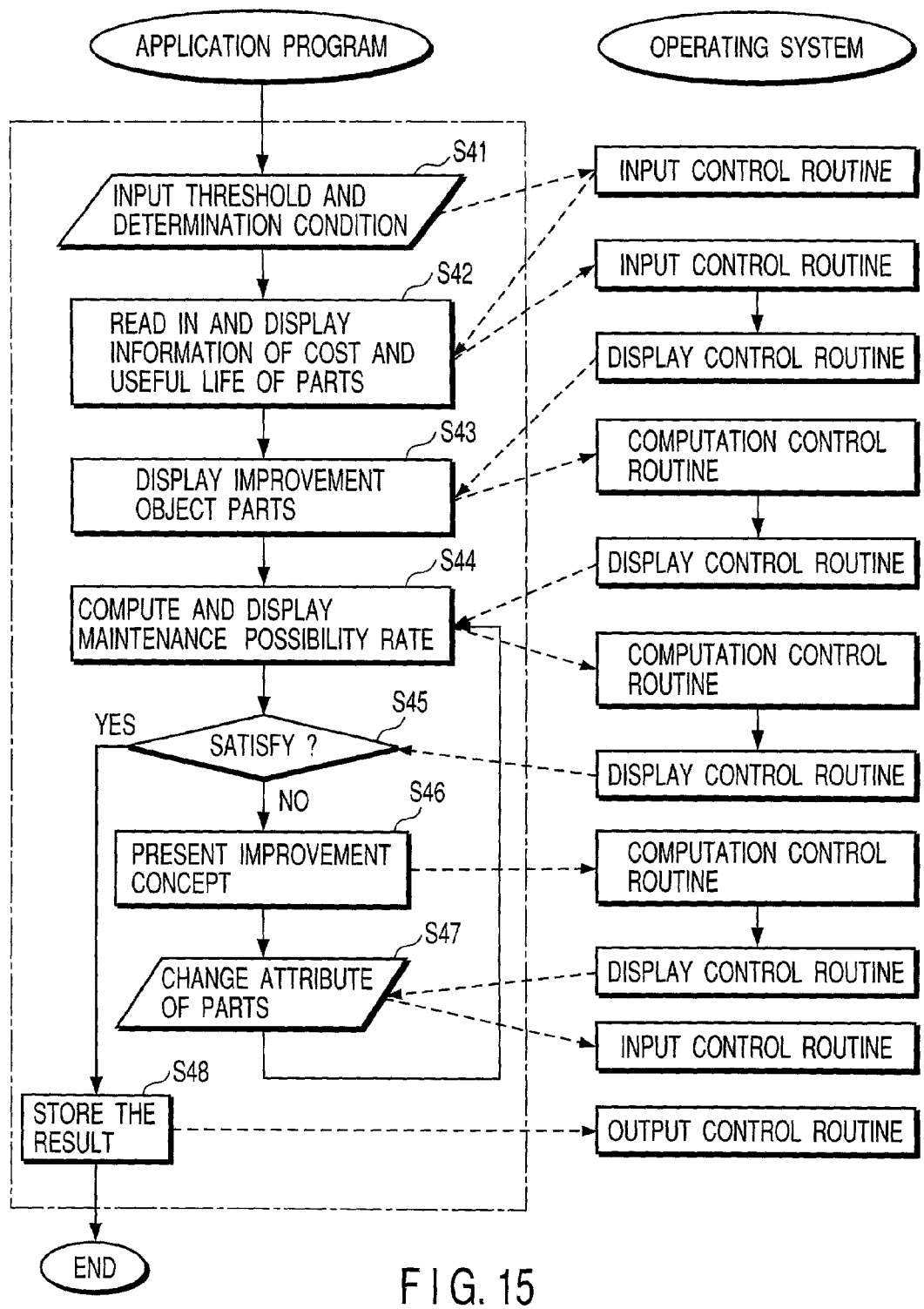
FIG. 15 shows cooperation between application program and operating system corresponding to the flow chart of aiding for improvement concept generation of maintainability.

FIG. 15 shows operation cooperation relation between application program and operating system (OS) corresponding to process of aiding for generation of improvement concept of maintainability shown in FIG. 12.

Thus, in this embodiment, information concerning use period and useful life of parts is generated, two-dimensional graph wherein useful life of parts and cost ratio of parts to the whole product are indicated by abscissa and ordinates axes respectively is displayed with parts constructing the produce. A part which is impossible to maintain for replacement and has the smallest useful life is extracted as an improvement object part.

Next, process of aiding for improvement concept generation of reusability will be described with reference to FIG. 16. First, the planner sets threshold values T3 and T4 wherein reuse of parts is fascinated from the aspect of cost and environment (S51). Then, the system reads in cost of parts and environment load information from database LCC-DB, LCP-DB (S52) and displays on a map as shown in FIG. 17 (S53). The relative cost (%) shown by axis of ordinates means ratio of parts cost to the whole product cost. Relative $CO_2$ generation (%) shown by axis of abscissas means ratio of $CO_2$ generation quantity that specific parts concerns, to $CO_2$ generation quantity of the whole product which is generated at the step of procurement. In addition, it is preferable that the planner inputs data with estimation if information to be read in is not existed in the database.

Threshold values T3 and T4 are within a range of 10%–20%. In this example, the values are set to 15%. When these threshold values are decided, analysis map may be divided into four domains, that is, a domain where reuse should be actively examined (++), a domain where reuse should be fairly actively examined (+++), a domain (−) which is not suitable for reuse and a domain (+) where reuse may be examined.

Figure 18:
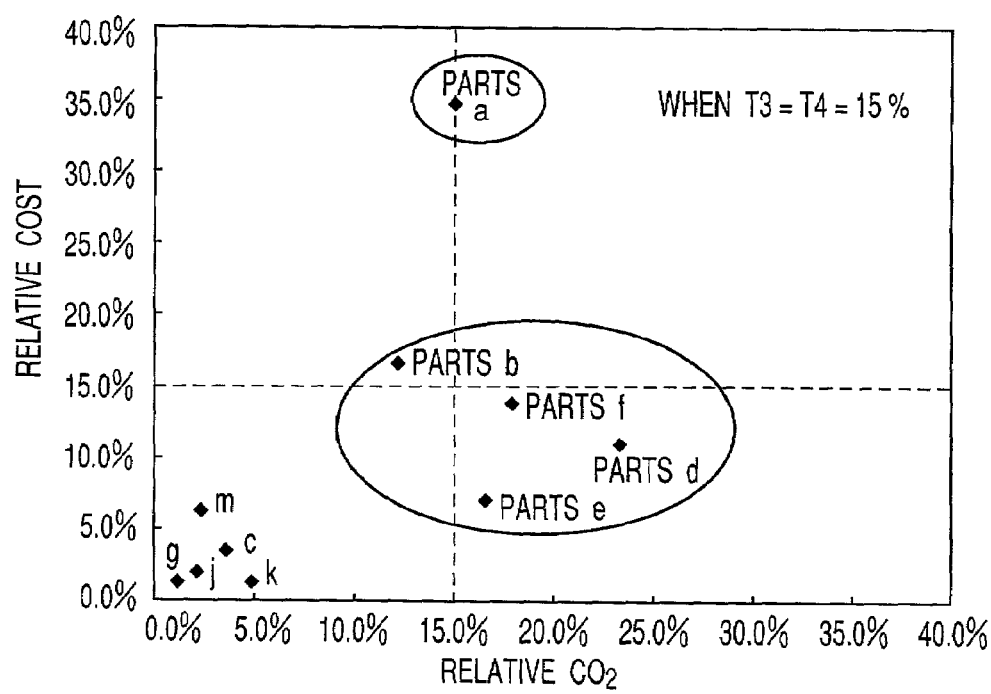
FIG. 18 shows a display example of the analysis map of relation between cost and environment load.

FIG. 18 shows an example in which parts of a washing machine are arranged on the map as threshold value T3=T4=15%. This example shows that, if possible, reuse of a part a is most effective and then reuse of a part b, a part c, a part d, a part e and a part f in turn should be examined. Thus, due to this map, it is preferable that a part having high cost ratio and high environment load rate is actively reused. It is preferable that a part which has large merit with respect to cost and whose environment load is not very large and costs high is reused. A part which has no merit with respect to cost and large environment load is reused preferably. A part having low cost ratio and low environment load rate is not suitable for reuse. Accordingly, using this map, a part to be suitable for reuse is made clear.

Figure 19:
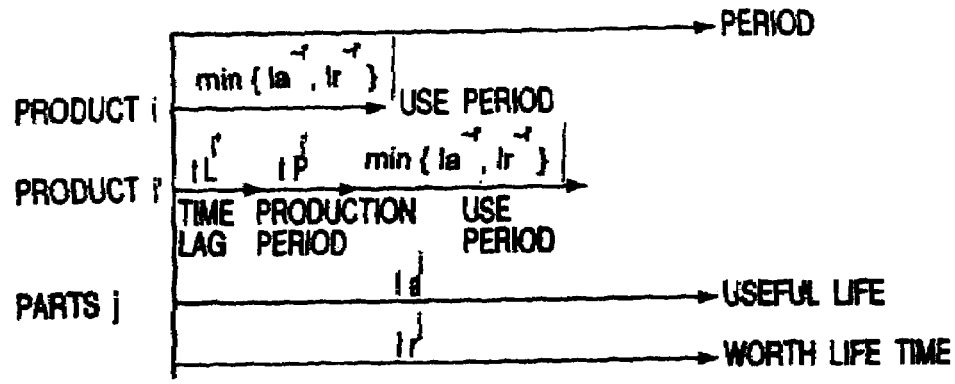
FIG. 19 shows a decision condition 1 of reuse possibility.
Figure 20:
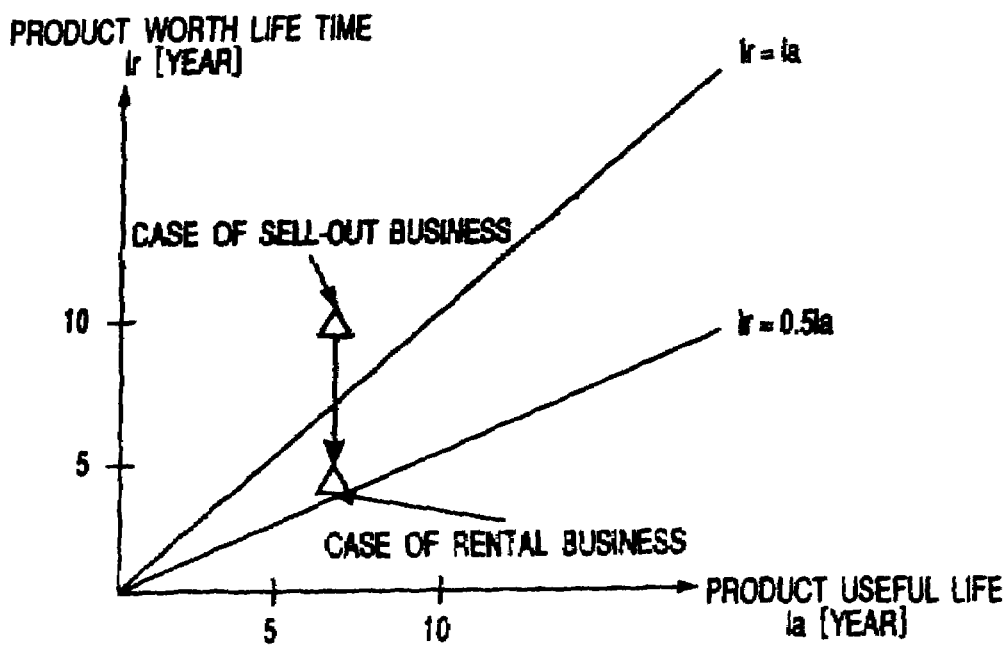
FIG. 20 shows a change example of design life.

The planner selects specific reuse candidate with reference to information of FIG. 18 (S54). At this time, the system analyzes reuse possibility of selected part. First, reuse possibility is calculated by a condition formula 1 shown in FIG. 19 from the aspect of useful life (S55). This condition formula 1 shows that the remaining useful life of parts j remains more than the use period of reuse destination product i' if the use period of product i is elapsed. Thus, condition formula 1 is a formula to determine whether the part j used in product i is reusable for product i'.

Next, it is determined whether the condition formula 1 is satisfied (S56), if this determination is No, change of use form is determined (S57). When reuse is examined again by the part which is determined that reuse is impossible by the condition formula 1, product use period is shortly changed so as to satisfy the condition formula 1 by changing a business scenario from sell-out type to rental type, for example (S58). When the business scenario can be changed so as to satisfy the condition formula 1, the process goes to the step S64.

Figure 21:
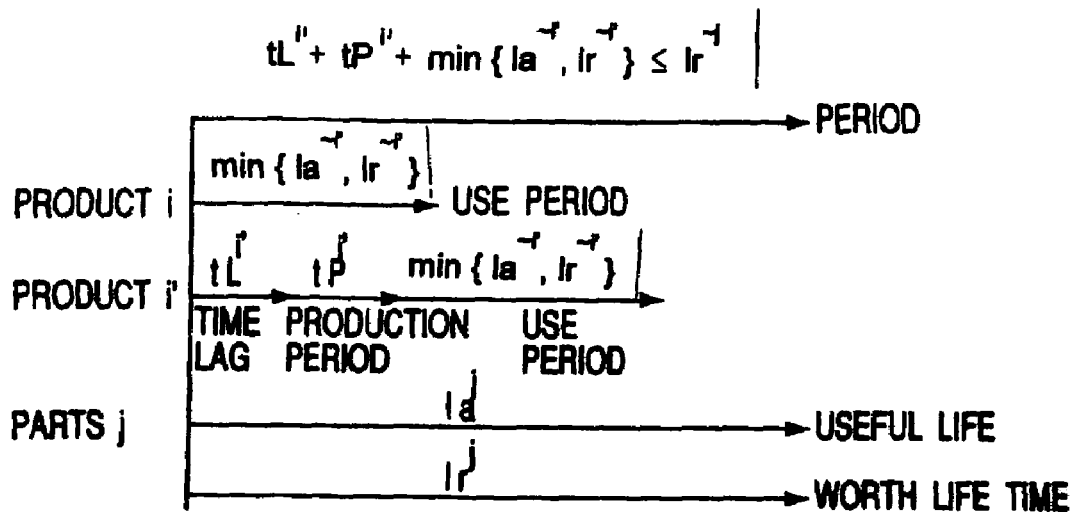
FIG. 21 shows a decision condition 2 of reuse possibility.
Figure 22:
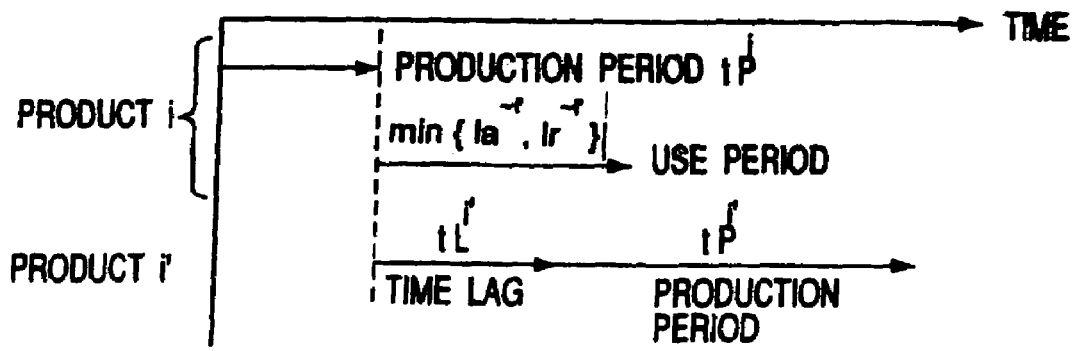
FIG. 22 shows a decision condition 3 of reuse possibility.

With respect to the part satisfied the condition formula 1, possibility of reuse is calculated by a condition formula 2 shown in FIG. 21 from the aspect of use period (S59). The condition formula 2 means that worth of parts j continues if time lag until production of product i' is started, the production period of product i' and the use period of product i are considered. Thus, the condition formula 2 is a formula to determine whether the part j used in product i is reusable for product i'. In addition, when production of reuse destination product i's started before production of reuse source product, it is determined by use start of reuse source product as reference.

Next, it is determined whether the condition formula 2 is satisfied as with the case of the condition formula 1 (S60), the part which is determined that reuse is impossible by the condition formula 2 is first examined whether it is reused as maintenance parts (S61). When reuse for other product is examined again, the business scenario is changed to examine as with the case described above.

Then, with respect to the reuse candidate part satisfied both the condition formula 1 and the condition formula 2, possibility of reuse is calculated by a condition formula 3 shown in FIG. 33 from the aspect of the amount of recover (S62). The condition formula 3 means that the amount of recovery of product i is enough within production period of reuse destination product i' of the part j. Thus, the condition formula 3 is a formula to determine whether the part j used in product i is reusable for product i'.

Next, it is determined whether the condition formula 3 is satisfied (S63), if this determination is Yes, possibility of reuse is determined with respect to all reuse candidate parts (S64), if the determination is No, it is examined whether it is reused as maintenance parts (S61).

Then, when possibility of reuse is determined with respect to all reuse candidate parts, the result is stored and the process is ended (S65).

Figure 16:
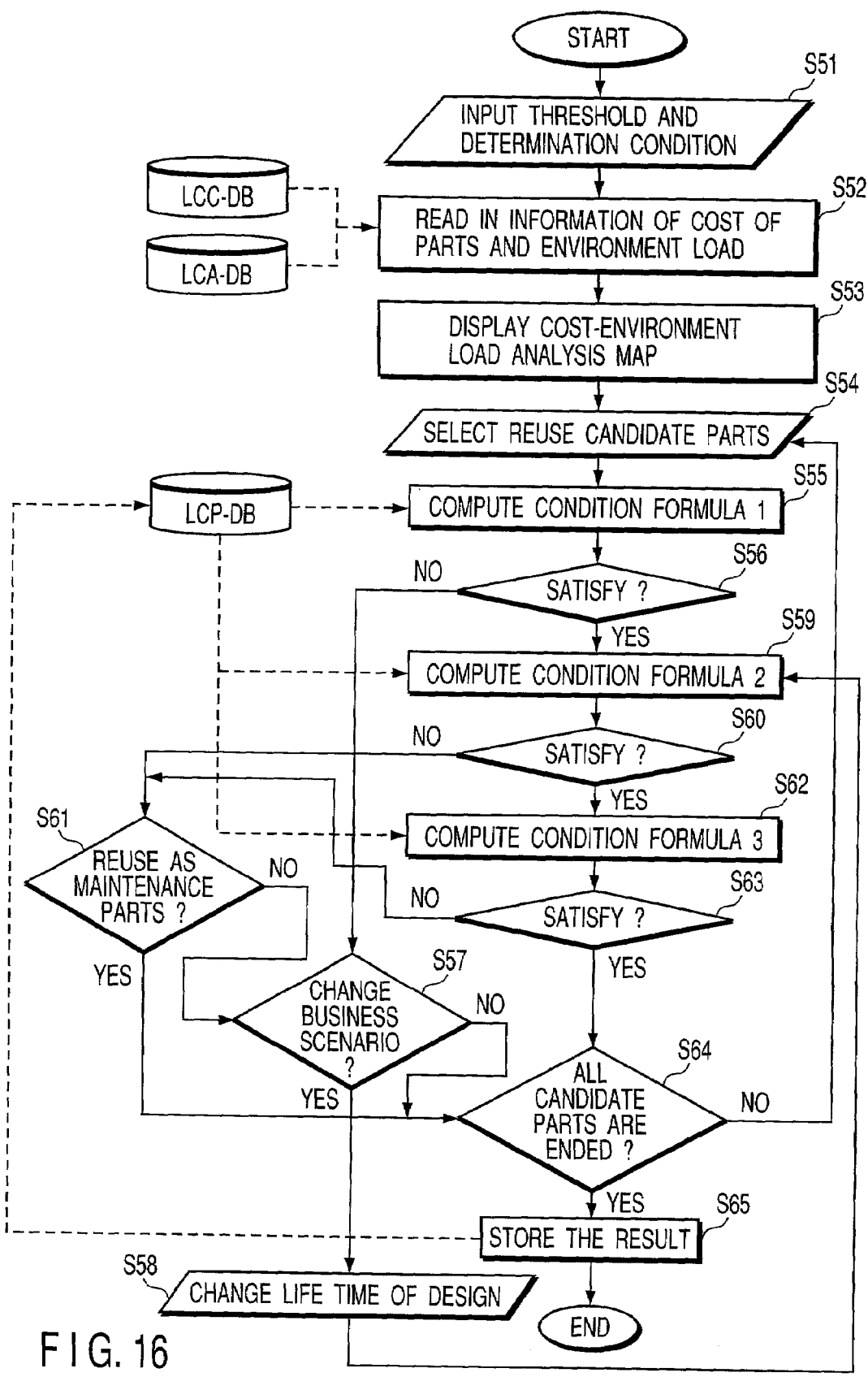
FIG. 16 shows a flow chart of aiding for improvement concept generation of reusability.
Figure 17:
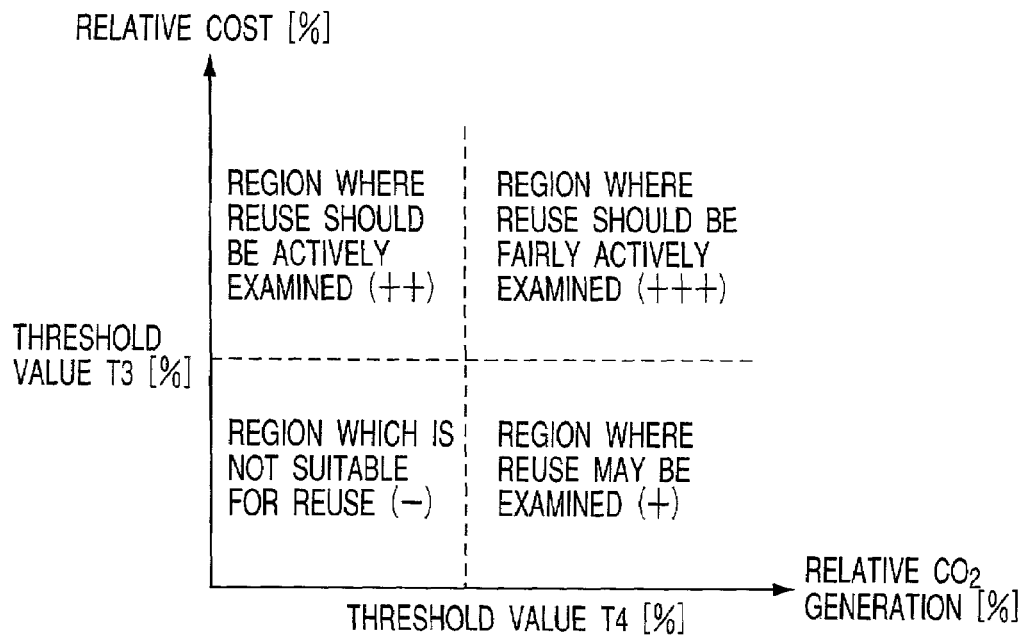
FIG. 17 shows an analysis map of relation between cost and environment load.
Figure 23A:
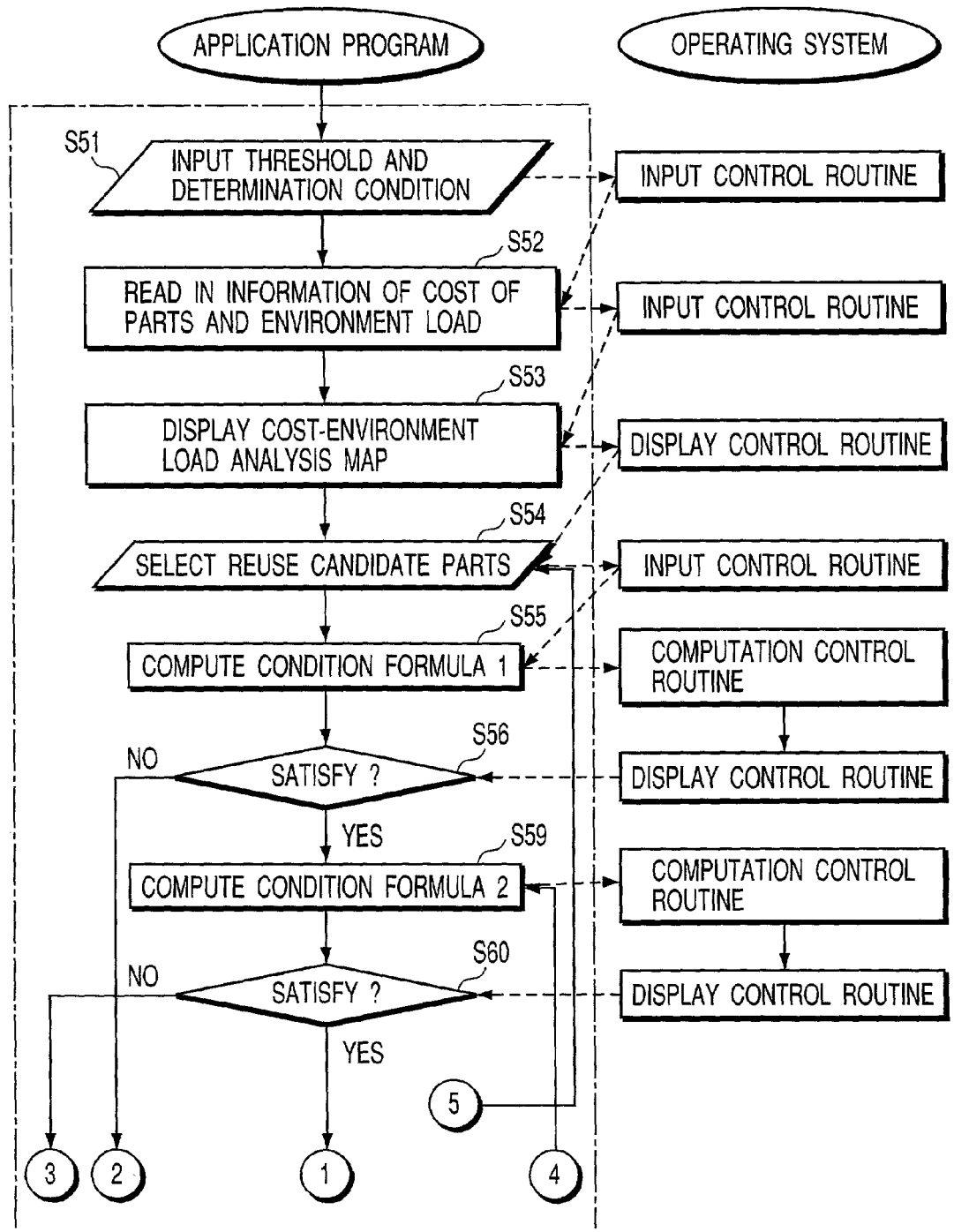
FIGS. 23A and 23B show cooperation between application program and operating system corresponding to the flow chart of aiding for improvement concept generation of reusability.
Figure 23B:
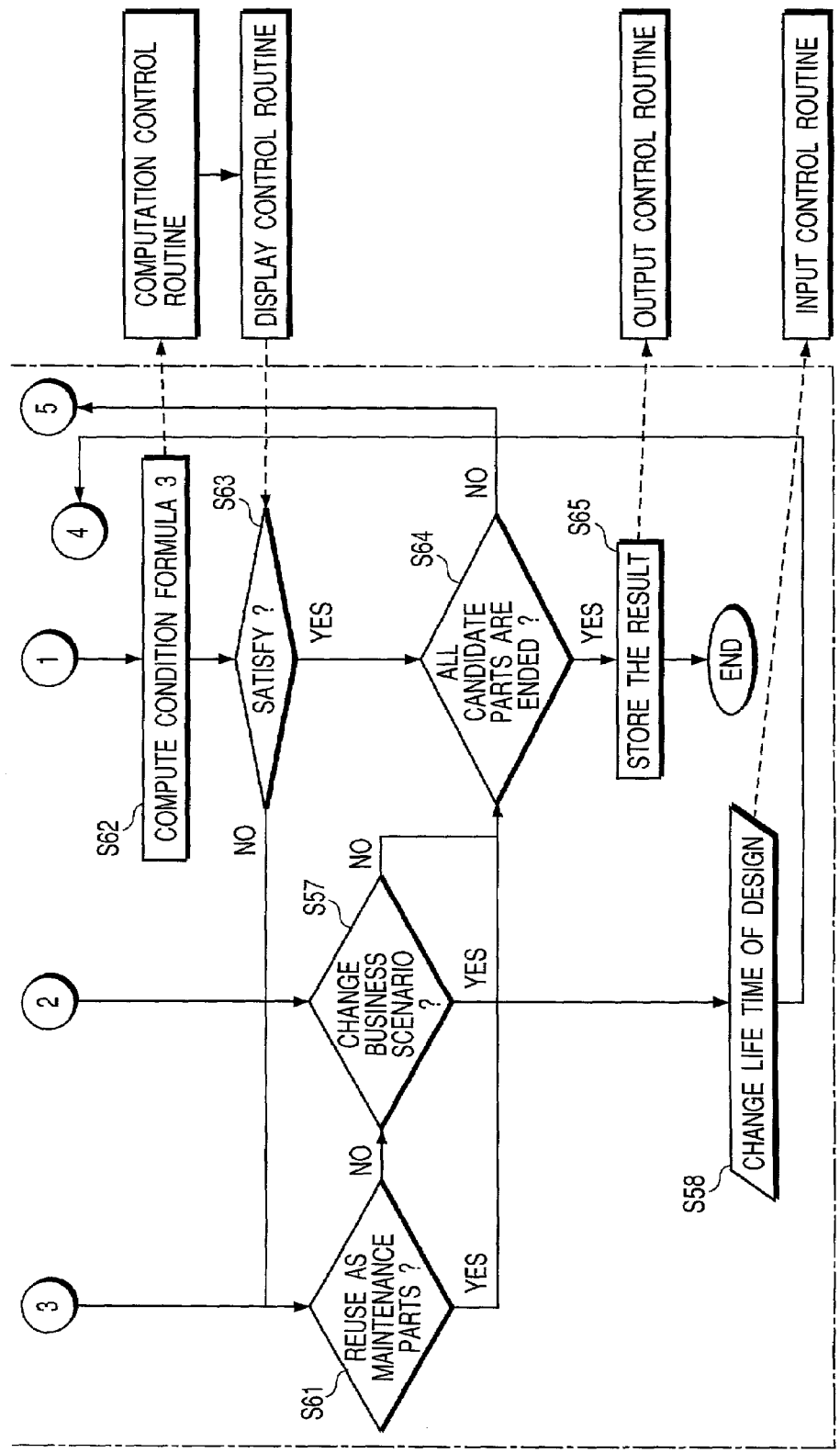

FIGS. 23A and 23B show cooperation relation between application program and operating system (OS) corresponding to aiding for improvement concept generation of reusability of the FIG. 16.

In accordance with the embodiment shown in FIGS. 16 to 23B, information concerning cost ratio of parts to the whole product and environment load ratio is generated. Two-dimensional graph wherein the cost ratio and the environment load ratio are indicated by axes is produced based on this information. Each part is assigned to one of division domains obtained by dividing the graph based on determined threshold, and a reuse candidate part is extracted from a domain in which parts are existed.

In addition, information concerning the use period of reuse source product i, the remaining useful life of parts j to be included in the reuse source product, the use period of reuse destination product i' and the production period of reuse source product i are generated. It is determined that parts is possible to reuse only in the following case:

a. The remaining useful life of parts j to be included in the reuse source product remains more than the use period of reuse destination product i' if the use period of reuse source product i is elapsed.

b. The worth of parts j continues even if in consideration of time lag to the start of production of reuse destination product i', production period of reuse source product i and use period of product i.

c. The amount of recovery of reuse source product i is enough within production period of reuse destination product i' based on the information.

Owing to concept generating process, the planner can generate improvement concept element in the aspect of environment. The planner decides possibility of realization of generated concept element in consideration of trade-off with performance of product. Lastly, calculation of life cycle simulation such as LCP or LCC is made, and reasonability of concept of environmental harmonization product is ascertained (FIG. 2).

Determined environmental specification and concept of environmental harmonization product are summarily displayed, and the result is stored in file.

Figure 24:
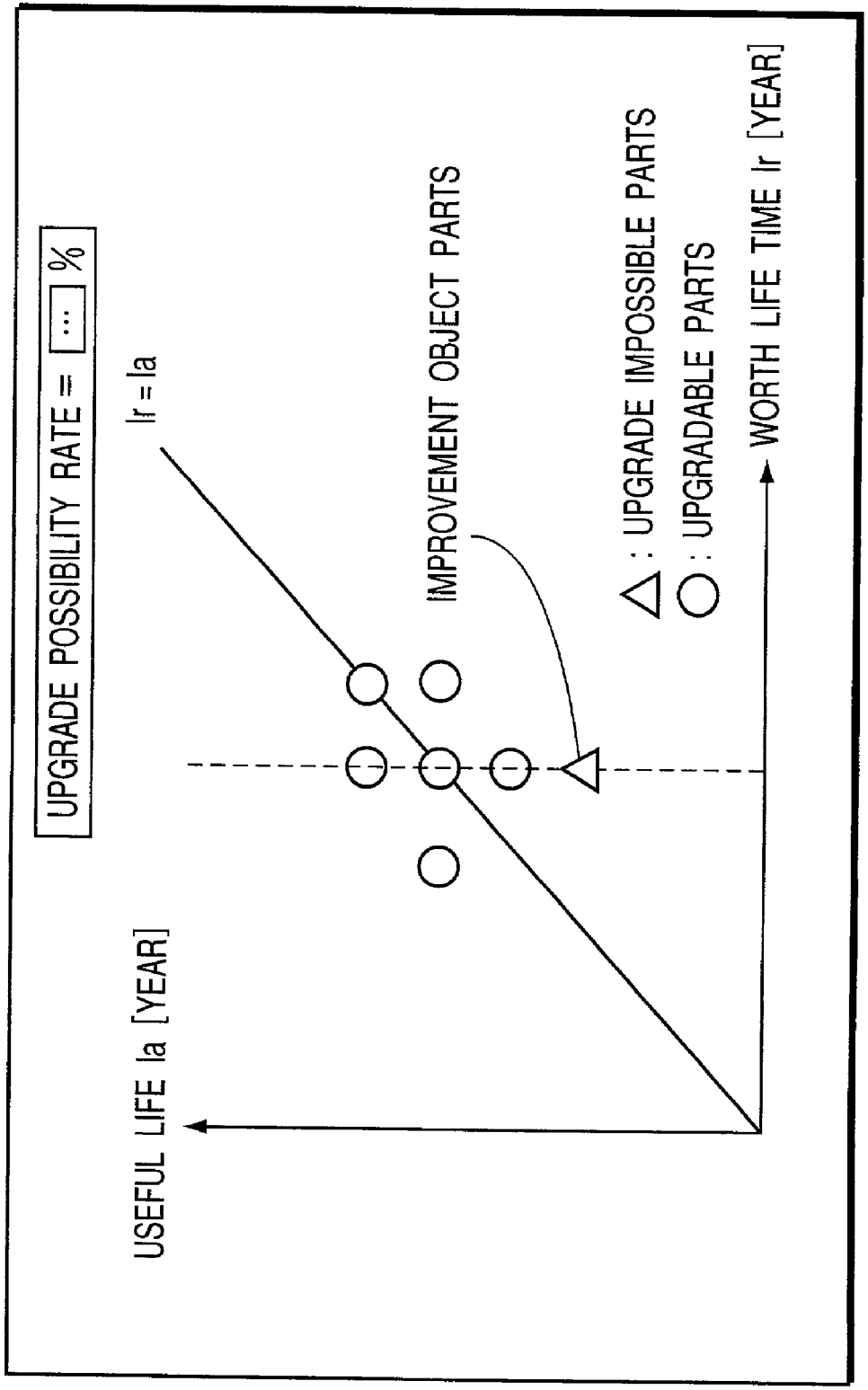
FIG. 24 shows a display screen of improvement object parts for upgrade in accordance with another embodiment of the present invention.
Figure 25:
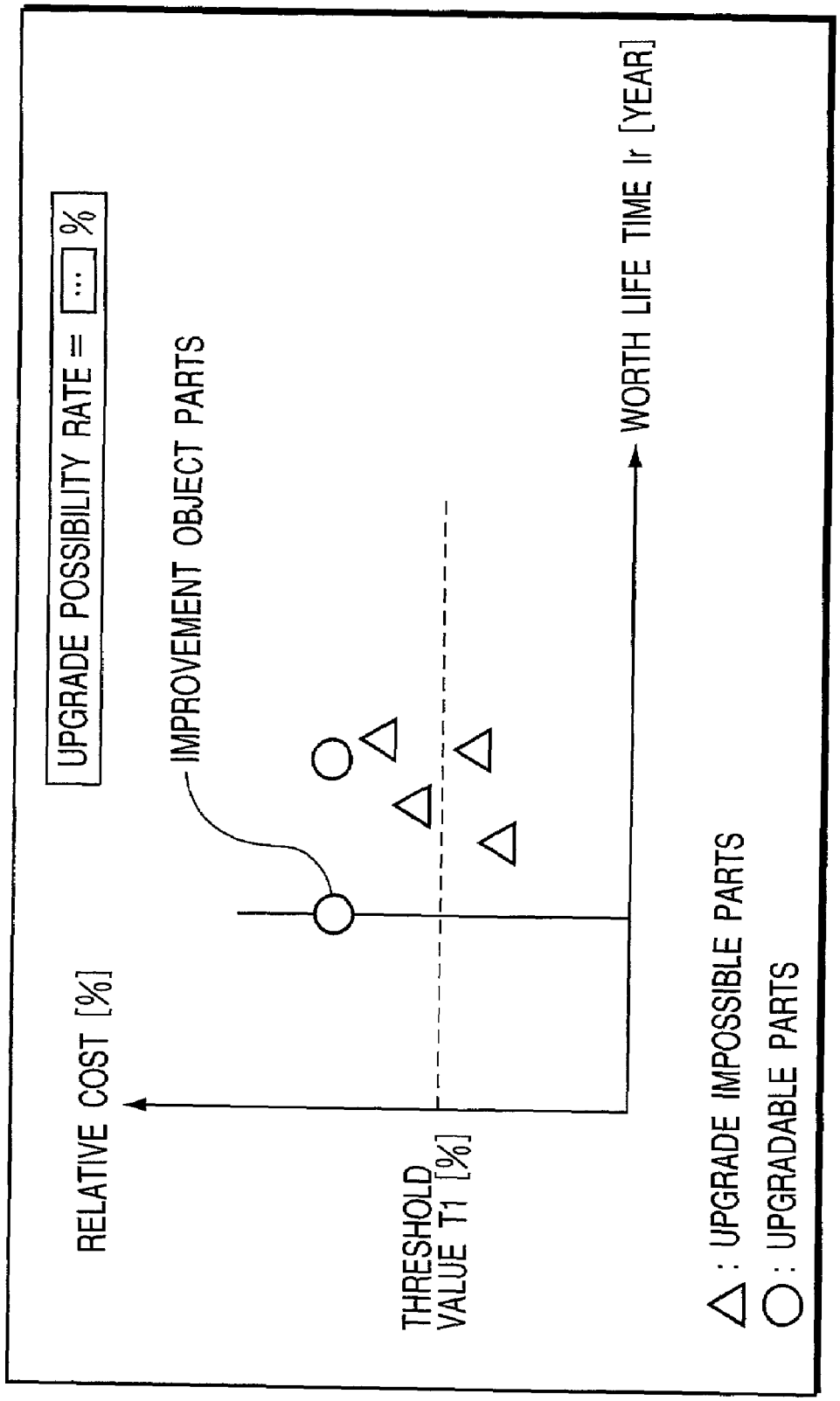
FIG. 25 shows a display screen of improvement object parts for upgrade in accordance with another embodiment of the present invention.

In the embodiment described above, the display of improvement object part of upgradability is based on relative cost and worth degradability as shown in FIG. 9, however, forms such as FIG. 24 or FIG. 25 are also preferable.

FIG. 24 shows that parts which is impossible to upgrade and replace and has shortest use period is extracted as improvement object parts when each parts is displayed on the graph wherein use period and useful life are indicated by axes. Accordingly, in this embodiment, information concerning use period and useful life of parts are generated, two-dimensional graph wherein use period and useful life of parts are indicated by axes is displayed with component parts based on this information, and parts which is impossible to upgrade and has shortest use period is extracted as improvement object parts.

Similarly, FIG. 25 shows that each parts is displayed on the graph wherein relative cost and use period of parts are axes, and a part whose use period is shortest is extracted as improvement object parts from the whole parts except parts which is not more than threshold value and is capable of upgrade. Accordingly, in this embodiment, information concerning use period of parts is generated, and a part whose use period is shortest is extracted as improvement object parts from the whole parts except parts which is not more than threshold value and is capable of upgrade.

Figure 27:
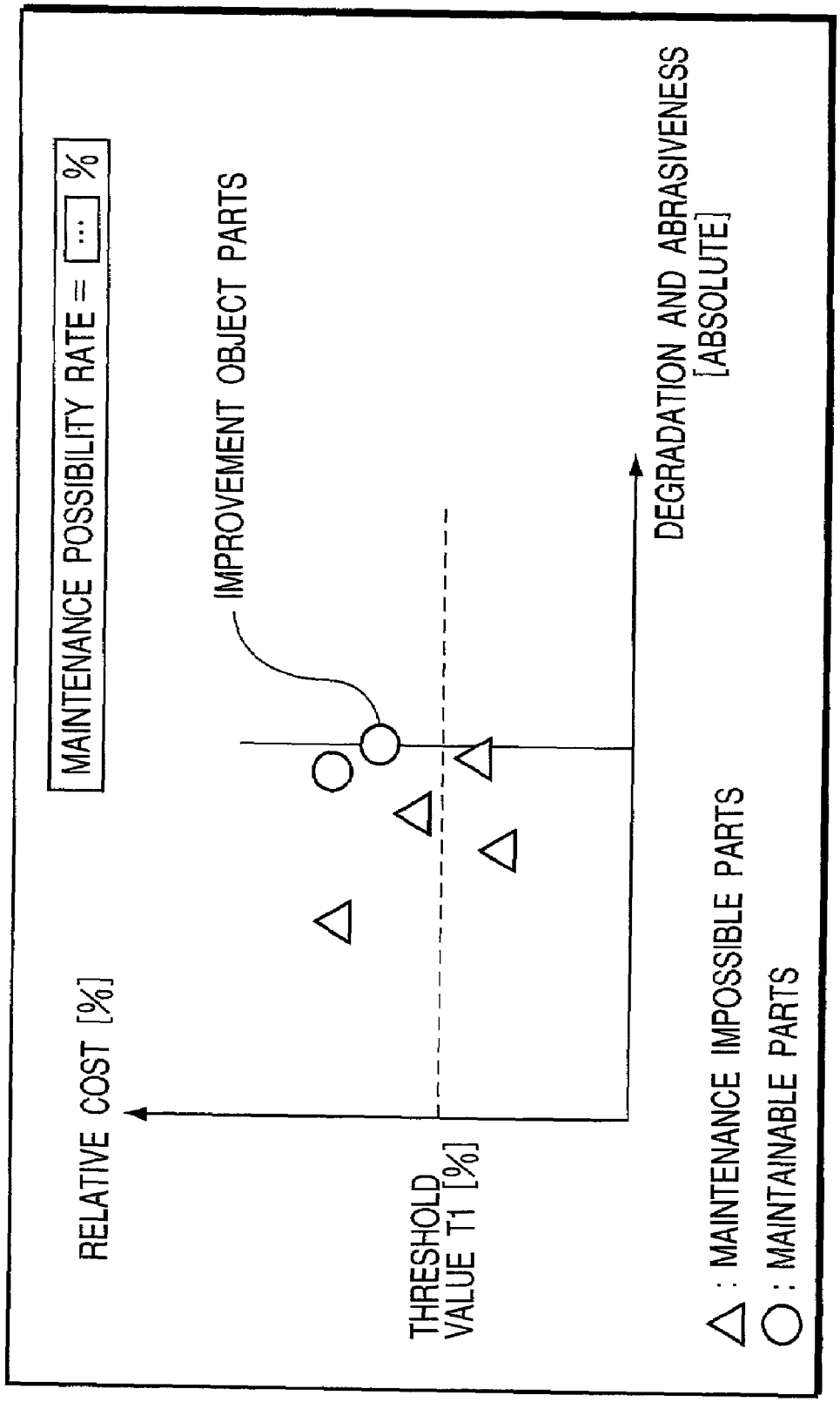
FIG. 27 shows a display screen of improvement object parts for maintainability in accordance with another embodiment of the present invention.

In addition, in the embodiment described above, the display of improvement object parts of maintainability is based on relative cost and useful life as shown in FIG. 13, however, forms such as FIG. 26 or FIG. 27 are also preferable.

FIG. 26 shows that parts which is impossible to maintain and replace and has shortest useful life is extracted as improvement object parts when each part is displayed on the graph wherein use period and useful life are indicated by axes. Thus, in this embodiment, information concerning useful life of parts is generated, and parts which is impossible to maintain and replace and has shortest useful life is extracted as improvement object parts.

Similarly, FIG. 27 shows that each parts is displayed on the graph wherein relative cost and degradation and abrasiveness of parts are indicated by axes, and parts which is impossible to maintain and replace and whose degradation and abrasiveness is largest is extracted as improvement object parts. Thus, in this embodiment, information concerning degradation and abrasiveness of parts and cost ratio of parts to the whole product are generated, and a part whose degradation and abrasiveness is largest is extracted as improvement object parts from the whole parts except parts which is not more than threshold value and is capable of maintenance.

Figure 28:
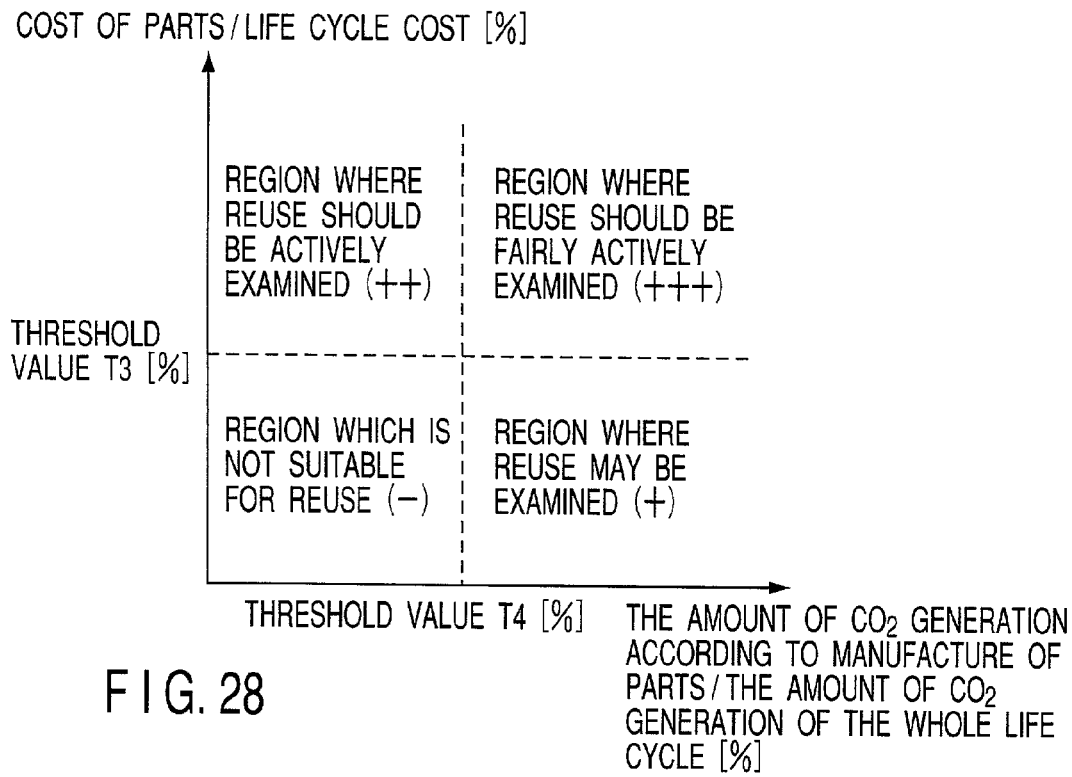
FIG. 28 shows an analysis map of relation between cost and environment load in accordance with another embodiment of the present invention.

The analysis map concerning cost and environment load as shown in FIG. 17 is based on ratio of relative cost to relative $CO_2$ generation quantity. However, as shown in FIG. 28, two axes may indicate ratio of parts cost to life cycle cost of product and that of $CO_2$ generation quantity generated in the step of materials procurement of specific parts to $CO_2$ generation quantity generated in the whole life cycle of product. Environment load is not limited to $CO_2$, it is preferable that random environment characteristic such as NOx or SOx is set.

Figure 29:
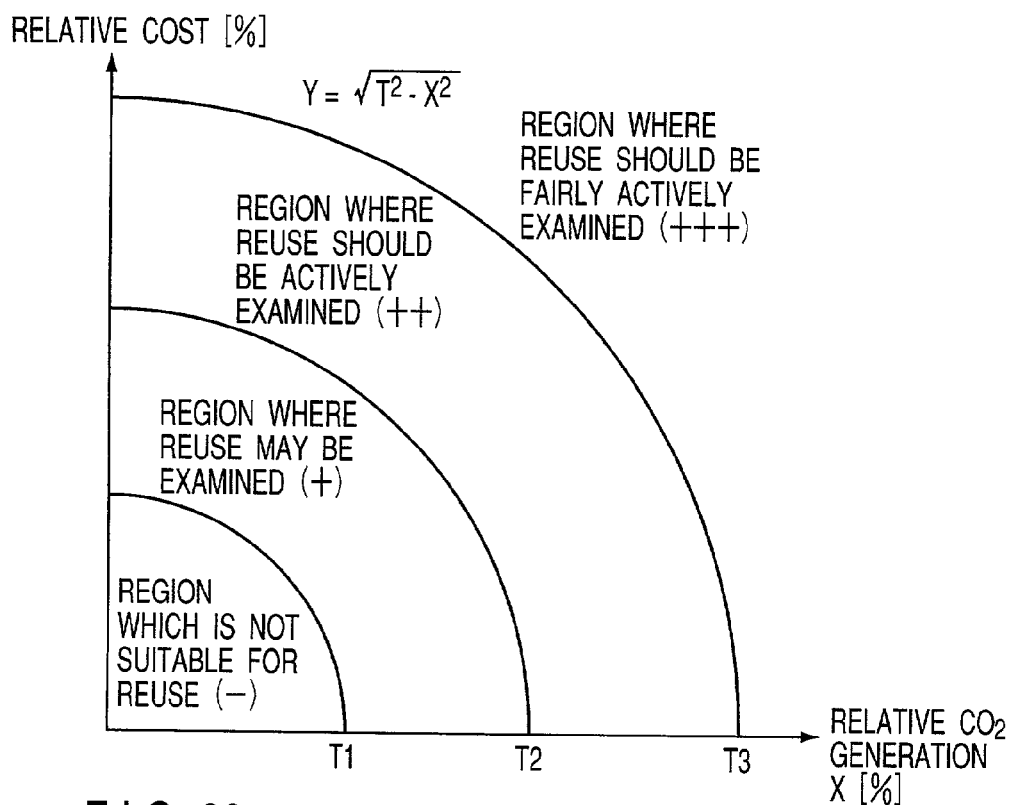
FIG. 29 shows an analysis map of relation between cost and environment load in accordance with another embodiment of the present invention.

Similarly, the map shown by FIG. 17 may be divided as shown in FIG. 29. In other words, when the relative cost is indicated by Y and the relative CO2 generation quality by X, the curves according to the equation $Y=\sqrt{(T2-X2)}$ (Y: threshold value) are drew by threshold values T1, T2 and T3. The domains sectioned by these curves are allocated by the extents of reuse examination.

If it is possible to determine that parts j is usable even if in consideration of time lag to the start of production of product i', production period of product i and use period of product i', in the case that use period of parts is not clear, the condition formula 2 concerning reuse possibility as shown in FIG. 21 may be satisfied.

In accordance with the present invention, product improvement planning which effectively improves performance, cost and the aspect of environment of product for generation products may be produced. By following this improvement planning, customer demands and environment demands may be compatible without useless development investment.

A plurality of designers can work cooperatively to accomplish the design target by sharing produced product improvement planning in the following steps of design and estimate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for aiding product life cycle planning, comprising:

setting a threshold value concerning reuse of parts with respect to cost and environment;

reading cost of parts and environment load information from a database;

displaying parts on a map displayed on a display device and divided into a plurality of domains based on the threshold;

selecting reuse candidate parts from the displayed parts with reference to the displayed map;

calculating a useful life based condition formula expressed as follows:

$\min \{la^{-i'}, lr^{-i'}\} \leq la^{-j} - \min\{la^{-i}, lr^{-i}\}$ where $la^{-i'}$ is a useful life time of product i', $lr^{-i'}$ is a worth life time of product i', $la^{-j}$ is a useful life time of part j, and $lr^{-j}$ is a worth life time of part j, determining whether the useful life based condition formula is satisfied;

determining possibility of reuse with respect to the reuse candidate parts when the useful life based condition formula is satisfied;

calculating a worth life time based condition formula expressed as follows:

$tL^{i'} + tP^{i'} + \min\{la^{-i'}, lr^{-i'}\} \leq lr^{-j}$ where $tL^{i'}$ is a time lag of product i', and $tP^{i'}$ is a production period of product i', $la^{-i'}$ is a useful life time of product i', $lr^{-i'}$ is a worth life time of product i', and $lr^{-j}$ is a worth life time of part j, determining whether the worth life time based condition formula is satisfied; and determining possibility of reuse with respect to the reuse candidate parts when the worth life time based condition formula is satisfied;

calculating a recovery quantity based condition formula expressed as follows:

$\min\{la^{-i'}, lr^{-i'}\} < tL^{i'} + \alpha tP^{i'}$ where $0 \leq \alpha \leq 1$, $la^{-i'}$ is a useful life time of product i', $lr^{-i'}$ is a worth life time of product i', $tL^{i'}$ is a time lag of product i', and $tP^{i'}$ is a production period of product i' determining whether the recovery quantity based condition formula is satisfied;

determining on a computer possibility of reuse with respect to the reuse candidate parts when the recovery quantity based condition formula is satisfied; and displaying the determination of possibility of reuse with respect to reuse of candidate parts.

2. The method according to claim 1, wherein the map is divided into four domains: a domain where reuse should be actively examined, a domain where reuse should be fairly actively examined, a domain which fails to be suitable for reuse and a domain where reuse is examined.

3. An apparatus of aiding product life cycle planning, comprising:

an input device configured to set a threshold value concerning reuse of parts with respect to cost and environment;

a reading device configured to read cost of parts and environment load information from a database;

a display device configured to display parts on a map divided into a plurality of domains based on the threshold;

a selecting device configured to select reuse candidate parts from the displayed parts with reference to the displayed map;

a computing device configured to calculate a useful life based condition formula expressed as follows:

$\min\{la^{-i'}, lr^{-i'}\} \leq la^{-j} - \min\{la^{-i}, lr^{-i}\}$ where $la^{-i'}$ a useful life time of product i', $lr^{-i}$ is a worth life time of product i', $la^{-j}$ is a useful life time of part j, and $lr^{-j}$ is a worth life time of part j, a first determining unit configured to determine whether the useful life based condition formula is satisfied;

a second determining unit configured to determine possibility of reuse with respect to the reuse candidate parts when the useful life based condition formula is satisfied;

the computing device calculates a worth life time based condition formula expressed as follows:

$tL^{i'} + tP^{i'} + \min\{la^{-i'}, lr^{-i'}\} \leq lr^{-j}$ where $tL^{i'}$ is a time lag of product i', and $tP^{i'}$ is a production period of product i', $la^{-i'}$ is a useful life time of product i', $lr^{-i'}$ is a worth life time of product i', and $lr^{-j}$ is a worth life time of part j, the first determining unit determines whether the worth life time based condition formula is satisfied; and the second determining unit determines possibility of reuse with respect to the reuse candidate parts when the worth life time based condition formula is satisfied;

the computing unit calculates a recovery quantity based condition formula expressed as follows:

min $\{la^{-i'}, lr^{-i'}\} < tL^{i'} + \alpha tP^{i'}$ where $0 \leq \alpha \leq 1$, $la^{-i'}$ is a useful life time of product i', $lr^{-i'}$ is a worth life time of product i', $tL^{i'}$ is a time lag of product i', and $tP^{i'}$ is a production period of product i';

the first determining unit determines whether the worth life time based condition formula is satisfied; and the second determining unit determines possibility of reuse with respect to the reuse candidate parts when the recovery quantity based condition formula is satisfied.

4. The apparatus according to claim 3, wherein the map is divided into four domains: a domain, where reuse should be actively examined, a domain where reuse should be fairly actively examined, a domain which fails to be suitable for reuse and a domain where reuse is examined.

5. A computer readable recording medium containing a computer program to aide product life cycle planning, the program comprising instructions to:

set a threshold value concerning reuse of parts with respect to cost and environment;

read cost of parts and environment load information from a database;

display parts on a map divided into a plurality of domains based on the threshold;

receive a selection of reuse candidate parts from the displayed parts with reference to the displayed map;

calculate a useful life based condition formula expressed as follows:

min $\{la^{-i'}, lr^{-i'}\} \leq la^{-j} - \min\{la^{-i}, lr^{-i}\}$ where $la^{-i'}$ is a useful life time of product i', $lr^{-i'}$ is a worth life time of product i', $la^{-j}$ is a useful life time of part j, and $lr^{-j}$ is a worth life time of part j, determine whether the useful life based condition formula is satisfied; and determine possibility of reuse with respect to the reuse candidate parts when the useful life based condition formula is satisfied;

calculate a worth life time based condition formula expressed as follows:

$tL^{i'} + tP^{i'} + \min\{la^{-i'}, lr^{-i'}\} \leq lr^{-j}$ where $tL^{i'}$ is a time lag of product i', and $tP^{i'}$ is a production period of product i', $la^{-i'}$ is a useful life time of product i', $lr^{-i'}$ is a worth life time of product i', and $lr^{-i'}$ is a worth life time of part j, determine whether the useful life based condition formula is satisfied;

determine possibility of reuse with respect to the reuse candidate parts when the useful life based condition formula is satisfied;

calculate a recovery quantity based condition formula expressed as follows:

min $\{la^{-i'}, lr^{-i'}\} < tL^{i'} + \alpha tP^{i'}$ where $0 \leq \alpha \leq 1$, $la^{-i'}$ is a useful life time of product i', $lr^{-i'}$ is a worth life time of product i', $tL^{i'}$ is a time lag of product i', and $tP^{i'}$ is a production period of product i';

determine whether the worth life time based condition formulation is satisfied; and determine possibility of reuse with respect to the reuse candidate parts when the recovery quantity based condition formula is satisfied.

6. The program according to claim 5, wherein the map is divided into four domains: a domain where reuse should be actively examined, a domain where reuse should be fairly actively examined, a domain which fails to be suitable for reuse and a domain where reuse is examined.

* * * * *